US007555713B2

(12) United States Patent
Yang

(10) Patent No.: US 7,555,713 B2
(45) Date of Patent: Jun. 30, 2009

(54) WRITING AND READING AID SYSTEM

(76) Inventor: George Liang Yang, 4628 Kings Mill Way, Owings Mills, MD (US) 21117

( * ) Notice: Subject to any disclaimer, the term of this patent is extended or adjusted under 35 U.S.C. 154(b) by 591 days.

(21) Appl. No.: 11/068,614

(22) Filed: Feb. 22, 2005

(65) Prior Publication Data

US 2006/0190804 A1  Aug. 24, 2006

(51) Int. Cl.
*G06F 17/00* (2006.01)
(52) U.S. Cl. .................... 715/248; 715/234; 715/201; 715/205; 434/178; 705/1
(58) Field of Classification Search ................ 715/201, 715/205, 234, 506, 222; 434/178; 705/1; 382/176
See application file for complete search history.

(56) References Cited

U.S. PATENT DOCUMENTS

| 4,864,502 | A | * | 9/1989 | Kucera et al. | 704/8 |
| 5,131,053 | A | * | 7/1992 | Bernzott et al. | 382/176 |
| 5,835,922 | A | * | 11/1998 | Shima et al. | 715/209 |
| 6,154,757 | A | * | 11/2000 | Krause et al. | 715/205 |
| 7,036,075 | B2 | * | 4/2006 | Walker | 715/201 |
| 7,260,777 | B2 | * | 8/2007 | Fitzsimons et al. | 715/255 |
| 7,281,211 | B2 | * | 10/2007 | Jeannette et al. | 715/234 |
| 2002/0016801 | A1 | * | 2/2002 | Reiley et al. | 707/523 |
| 2002/0107699 | A1 | * | 8/2002 | Rivera et al. | 705/1 |
| 2002/0194379 | A1 | * | 12/2002 | Bennett et al. | 709/246 |
| 2003/0018663 | A1 | * | 1/2003 | Cornette et al. | 707/500.1 |
| 2003/0050803 | A1 | * | 3/2003 | Marchosky | 705/3 |
| 2004/0103367 | A1 | * | 5/2004 | Riss et al. | 715/506 |
| 2004/0163048 | A1 | * | 8/2004 | McKnight et al. | 715/517 |
| 2004/0205609 | A1 | * | 10/2004 | Milton et al. | 715/522 |
| 2005/0069849 | A1 | * | 3/2005 | McKinney et al. | 434/178 |

OTHER PUBLICATIONS

MSWord, 16 screen dumps depicting Microsoft Word '97 help and letter writing wizard functionality, copyright circa 1996.*
Camarda, "Using Microsoft Word 97," QUE, copyright circa 1997, pp. 19, 187-192, 797-798.*

* cited by examiner

*Primary Examiner*—Doug Hutton
*Assistant Examiner*—James H Blackwell

(57) ABSTRACT

A writing and reading assistant system helps a user to create a structured document and read a document. A structured document contains not only information as an ordinary document does but also properties and rules for holding, organizing and processing corresponding portions of information. The system helps the user as an author to search for information, generate, organize, examine, and modify ideas, to supply details, to examine one's writing from various aspects, to revise the writing, to specify information and access methods suitable for different audience, and to create a structured document. Further, the system helps the user as a reader to create and modify structures, define and modify properties and rules, and define and specify display forms, to associate text blocks with corresponding properties and rules, to extract information from an input document, to fill structures with corresponding information, to build various links among structures and display forms, and to display structures.

20 Claims, 22 Drawing Sheets

WRITING AND READING AID SYSTEM

FEDERALLY SPONSORED RESEARCH

Not Applicable

SEQUENCE LISTING OR PROGRAM

Not Applicable

TECHNICAL FIELD OF THE INVENTION

The invention relates generally to a system for improving the reading efficiency of a user as a reader and the writing effectiveness of a user as an author by using an organized structure. More particularly, by providing a structure for classifying information, the system disclosed in the invention helps an author to collect information, arrange ideas, develop details, select templates, view differently, and create a structured document and helps a reader to extract information from a reading material, organize information, modify information, specify presentation method, and present information.

BACKGROUND OF THE INVENTION

A regular book passes its information from its author to its readers. There are several disadvantages. First, a regular book cannot adopt itself to serve the different needs of many readers. Before an author starts writing a book, usually the author has to figure out his or her target audience. If the target audience is too small, then many people could not be interested in the book, and therefore the selling volume for the book will become a problem. If the target audience is too large, then the author could have difficulty to present information effectively, and therefore the communication effectiveness will become a problem. Different readers usually have different requirements on how to organize information and how to present information. Sometimes these requirements can contradict each other. To meet the needs of different readers, though an author could show information in many different ways in a same book, the book will then become very tedious, and therefore a reader will have difficulty to access particular information. Due to these limitations, an author usually has to compromise the demands from the readers under different categories. The author can target at several major categories and illustrate information in several ways with each suitable to one of the selected categories. In this way, though the book may look dull, the author could be able to handle the requirements from the reader of several targeted categories. However, the author is still unable to treat each reader individually. It is reader's responsibility to skip unwanted information, locate related information, and digest information. How effective a reader can read a book solely depends on the description in the book as well as the reading skill and the comprehension capability of the reader.

Second, a regular book cannot adopt itself to meet the different requirements of a same user during different stages of reading the book. A reader may require a book to organize and present information differently when the reader reads the book for the first time from when the reader reads the book for the second time, from when the reader reads the books for the third time, and from when the reader reviews the book. Though an author could make different presentations for same information in a same book, the book can then become very unnecessary long, and therefore a reader may have difficulty to locate interesting information. Again, it is the reader's task to locate related information, to look at an issue from different view of point, and to organize the information.

Third, the information flow on a regular book is in one direction. A regular book passes information from its author to its reader, but not from its reader to its author. When a reader has a problem in reading a regular book, the book does not provide a mechanism for the reader to ask the author a question and for the author to present information differently For the above reasons, it is desirable to create a system for helping a reader to access information efficiently and helping an author to present information effectively.

OBJECTIVE OF THE INVENTION

The primary objective of the invention is to provide a system for a reader to access information from a reading material efficiently by letting the reader specify what the reader may be interested in, search for particular information, and display searched results in a proper format.

Another objective of the invention is to provide a system to present same information differently for different readers and for a same reader at different reading stages.

Another objective of the invention is to provide a user a virtual secretary to organize information and present information according to the user's requirements.

Another objective of the invention is to provide a system for a reader to ask question and for an author to help the reader by giving different explanations, offering other examples, and presenting differently.

Another objective of the invention is to provide a system for a reader to access information by applying grammar analysis on a document, displaying subjects, verbs, and objects as well other sentence structures in different fonts, animating sentence structures, flushing important words, linking image to major issues, and creating sounds for related texts.

Another objective of the invention is to provide a system for a user to train, practice, and master speed reading skills and other good reading habits.

Another objective of the invention is to provide a system for an author to stimulate ideas, search ideas, view ideas, edit ideas, organize ideas, give examples, examine configuration, and create a structured document.

Another objective of the invention is to provide a system for an author to use a different method on each group of target audience and on a same group of target audience at a different stage by letting the author to view ideas from different aspects, describe an issue in many different ways, create different examples, bind information dynamically, and present information flexibly.

Another objective of the invention is to provide a system for a user to break down a complex writing or reading task into a few simpler and smaller subtasks that the user can complete each subtask relatively easier by following the procedures and the examples associated with corresponding templates.

SUMMARY OF THE INVENTION

The system comprises of a writing aid subsystem for helping a user as an author to write effectively and a reading aid subsystem for helping a user as a reader to read efficiently.

The writing aid subsystem helps a user to separate a writing process into many small tasks with each small task associated with proper interface, guidance, help, example, and template. The subsystem also aids the user to collect, organize, display, and retrieve information, to stimulate, generate, sort, examine, and edit ideas from different aspects, to develop details for the ideas, to specify displaying formats, to separate target readers into various categories, and to create information, delivery methods for each category. Further, the subsystem lets the user to present information in many different ways with each for a different category of target readers and for a same category of target readers at a different stage and create a structured document that contains the organized information and the default delivery methods for several particular categories and for several particular stages.

The reading aid subsystem identifies the document type of an input document, create structures from the default structure templates associated with the document type, analyzes the input document, extracts information from database, Internet, and the input document, fills the structures with related information, and displays the structures in proper forms. The subsystem also helps a reader to specify structures and their associated rules, to specify how to display structures, to displays subjects, verbs, and objects as well as other sentence structures animatedly, and to build links among structures, their substructures, and display forms. The subsystem further helps a reader to train, practice, and master speed reading skills and other good reading habits.

BRIEF DESCRIPTION OF THE DRAWINGS

The drawing figures depict preferred embodiments of the present invention by way of example, not by way of limitations.

DETAILED DESCRIPTION OF THE PREFERRED EMBODIMENTS

Figure 1:
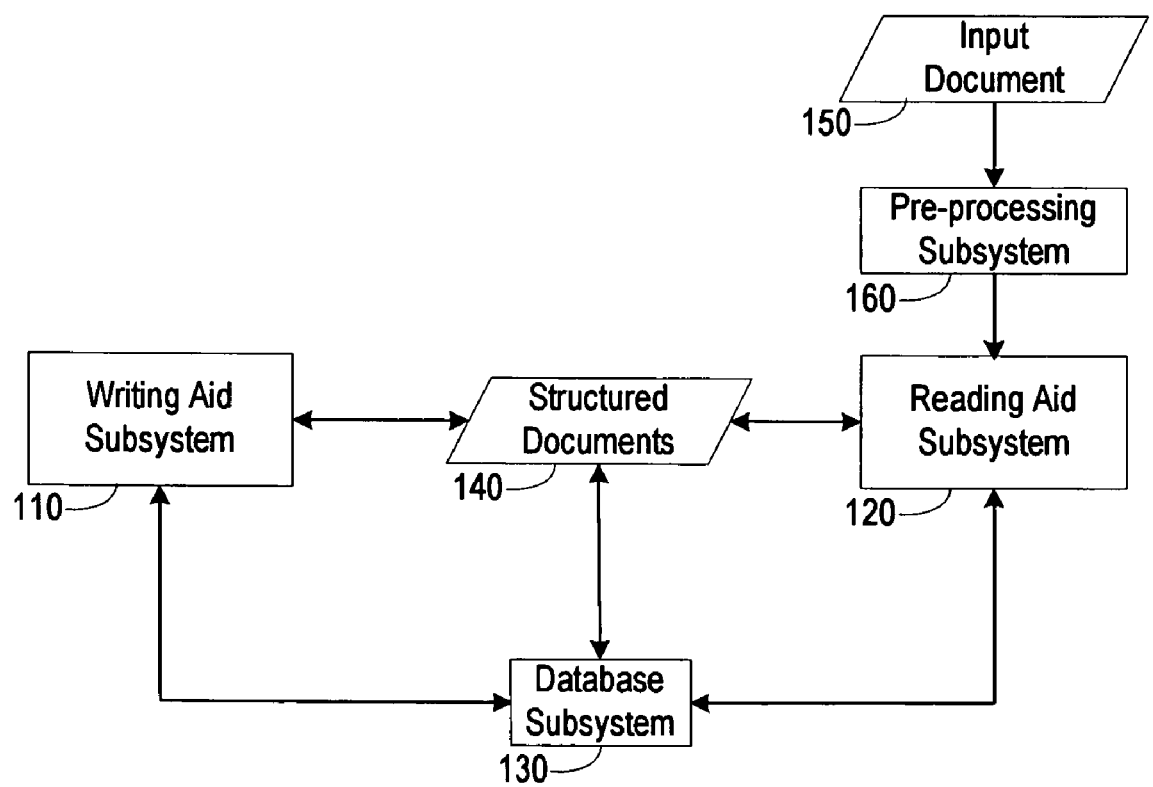
FIG. 1 illustrates the overall configuration of the invention.

FIG. 1 shows the overall configuration of a system for helping a user to write and to read. The writing aid subsystem 110 provides various interfaces to help a user to stimulate, develop, organize, and express ideas, to guide a user to develop details, to support a user to assign properties to related blocks of text, to organize information in a structure, to assist a user to configure display forms, and to generate a structured document. Here a structured document is a document containing organized information and assistant information for recovering the structure from the structured document. The counterpart of the writing aid subsystem 110 is the reading aid subsystem 120. It helps a user to survey a document, set up a reading purpose, and select a reading strategy, provides a user necessary interface to specify and modify rules for identifying the interesting portions of the document, extracts information, creates a structure to hold information systematically, and displays the structure in various formats. Another important component is the database subsystem 130. Saving all the rules, default settings, user preferences, session settings, and other useful information in proper record formats, the database subsystem 130 provides various database techniques for a user to search, edit, organize, and display its records. Here the rules are instructions for telling the system how to perform various tasks such as collecting information, searching for information, extracting information, handling information, and displaying information. Both the writing aid subsystem 110 and the reading aid subsystem 120 can generate the structured documents 140, which contain structured information explicitly or implicitly. According to the structured information, the system can display related information in one or more preferred ways, help a user as an author to write more effectively, and help a user as a reader to read more efficiently. The reading aid subsystem 120 can also handle a regular document 150 through the preprocessing subsystem 160, which converts a paper-based document into electrical images, separates figures from texts, and converts texts in an image format into texts in a non-image format.

Figure 2:
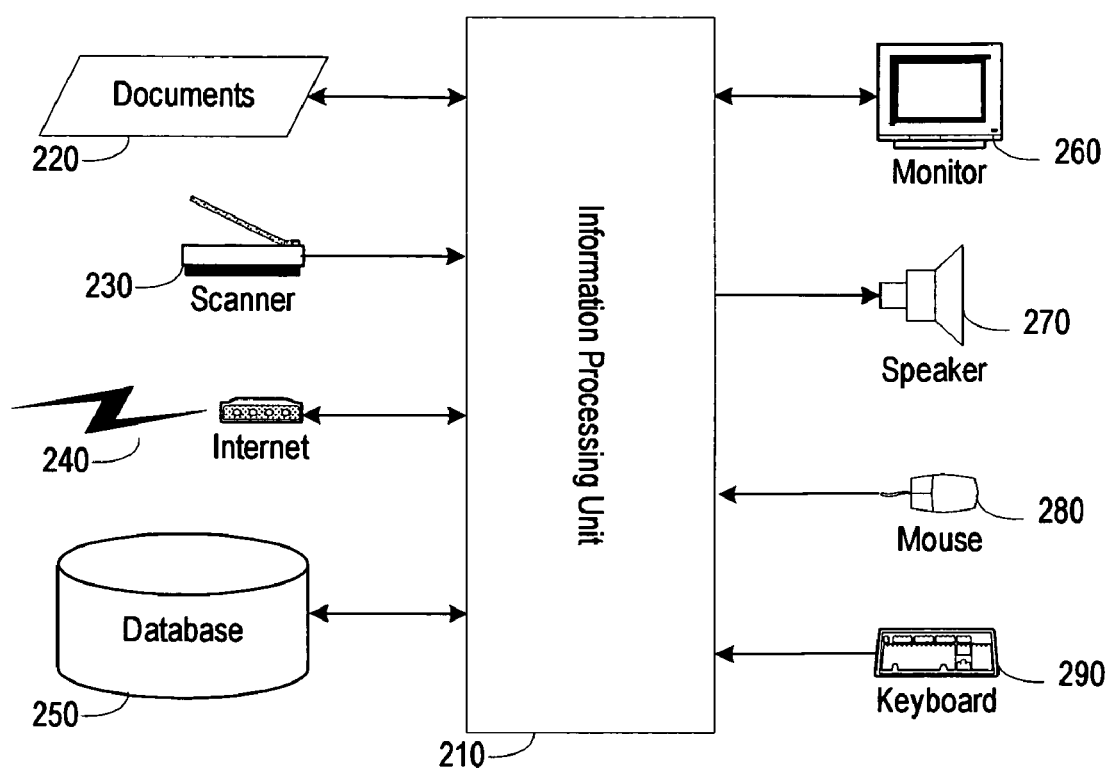
FIG. 2 illustrates the major devices used in the invention.

FIG. 2 shows the major devices in the system. The information processing unit (IPU) 210 is to control the processing of helping a user to write and to read. By running various utilities in the system and loading related information from the database 250 as well as Internet 240, the IPU 210 can create scripts, subroutines, and functions, arrange execution orders, generate commands for controlling each device, and search for supplementary information to compensate the information extracted from an original document. Here utilities are predefined procedures in the system. They can be in various forms such as script and compiled object subroutine. The IPU 210 can consist of one or more central processing units (CPU), random access memory, hard disk, communication ports, and special processors for completing particular purposes.

The documents 220 can be regular paper-based documents, electrical documents, or structured documents. If an input document is a paper-based document, the scanner 230 will scan the document and convert it into an electrical form.

According to background, preference, purpose, search templates, search rules, and the status for a particular issue, the IPU 210 can generate a corresponding search criterion and search for related information through Internet connection 240.

The database 250 is to save, search, modify, retrieve, display, and organize information. The information includes anything that a user is interested. Some examples are display forms, various rules, and important data. For example, if a user wants to examine information from many different aspects, the user may want to save several different display forms in the database with each one for emphasizing a particular aspect and displaying related information.

The monitor 260 is to display results. If the monitor 260 has the function to input information by touching screen, then the monitor 260 also serves as an input device to capture feedback from a user. Under the control of the IPU 210, the system can provide a user the verbal instructions and generate sounds for persons and other objects in an input document through the speaker 270. Other input devices such as mouse 280 and keyboard 290 catch up corresponding responses from a user.

Figure 3:
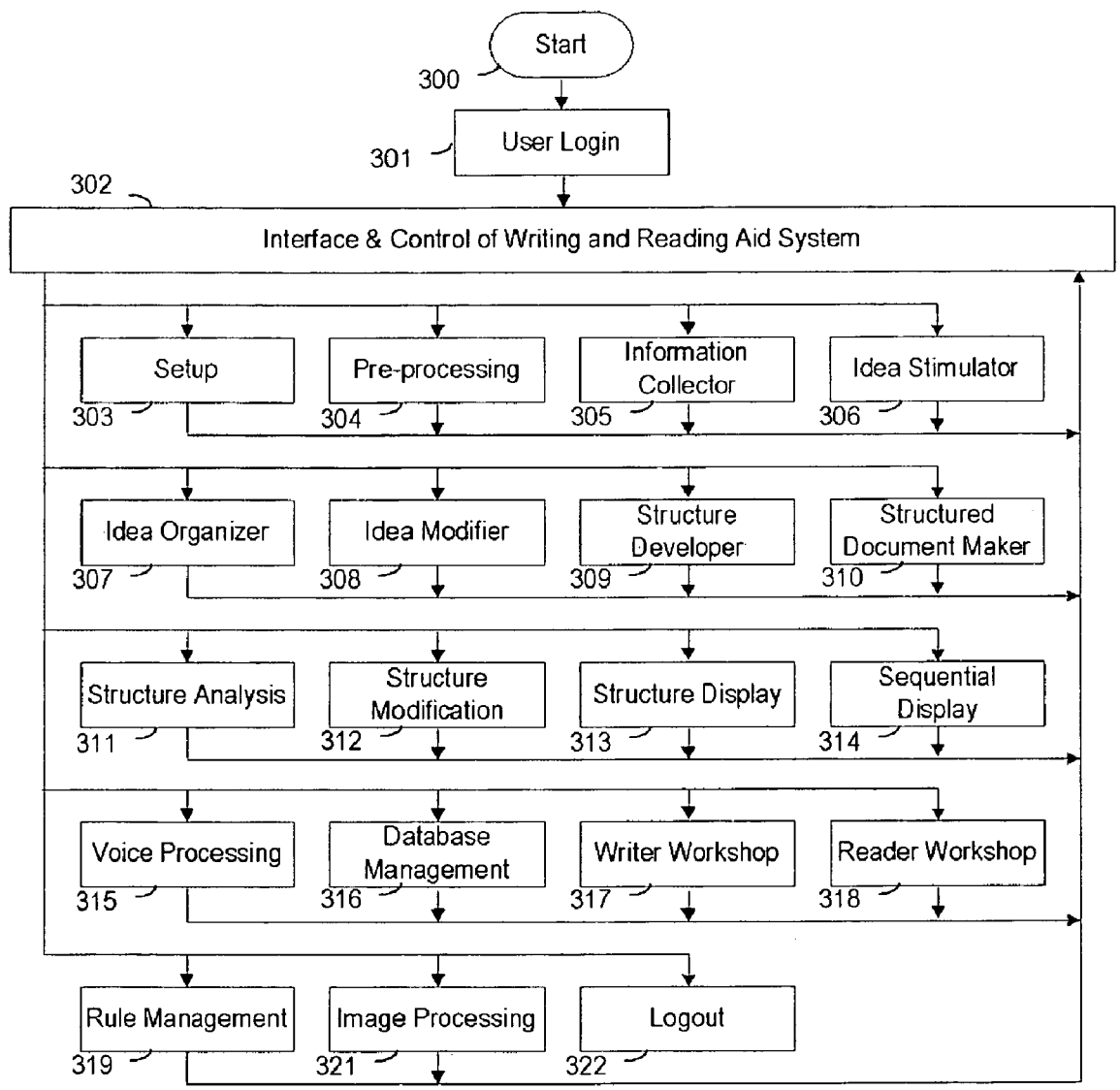
FIG. 3 illustrates the major modules of the invention.

FIG. 3 shows the major modules used in the system. The exemplary system is a window-based program, consisting of modules commonly used by the writing aid subsystem, reading aid subsystem, and the database subsystem. Through a proper window interface, a user can launch a module that is available at that particular moment. In addition, some modules can call other related modules to accomplish corresponding tasks. For example, when a user calls either the writer workshop module 317 or the reader workshop module 318, a window interface designed specifically for a writer workshop or for a reader workshop will appear respectively with the commonly used utilities and other modules displayed as menus, icons, and tool bars. Since different modules in FIG. 3 are for different purposes, it is convenient to explain them by different approaches. Some modules will be provided with only explanation descriptions, some modules with explanation descriptions plus their corresponding examples, some modules with explanation descriptions and their corresponding flowcharts.

When a user starts the system at 300, a login interface 301 will appear so that the user can login. During the login process, the system can identify the user and load the related information into the system. Then the system will launch the window interface and control module 302.

The window interface and control module 302 creates proper window interface and displays all other available modules so that a user can launch a module easily. The module 302 further passes information among different modules as well as utilities. For example, when a user clicks one of other available modules, the interface and control module 302 will generate proper parameters and arguments, pass them to a module to be called, run the module, and then take results back from the module.

The setup module 303 provides a graphic interface for a user to select preferences, specify default values, and default procedures. For example, a user can build a customized window interface by setting its menu, tool bar, icons, as well as key shortcuts. A user can also select one of the structure templates as the default structure template for a particular document type. Further, a user can select one of the display forms as the default display form for a particular document type. Besides setting preferences, default values, and default procedures on system level, a user can also set up preferences, default values, and default procedures on a particular module and on a particular reading or writing session. For example, in the writer workshop module 317, a user can select one of the several ways to perform brainstorm. In case of conflict on setting, the setup at module level will override the setup at system level and setup on a particular session will override the setup for a general session.

The preprocessing module 304 scans an input document, separates images into to text image blocks and figure image blocks, and converts text image blocks into texts. A user will use this module when the input document is a paper-based document or though the input document is an electrical document, its text is in a non-desired format such as an image format.

The information collector module 305 provides graphic interfaces for a user to collect information from various sources, specify how to save information, and establish links among the collected information and the information in database. This module can display a different graphic form to collect different information. For example, a form can have a window interface similar to the card used by a writer to record a beautiful sentence, a data, a figure, a table, and a new idea.

The idea stimulator module 306 provides graphic interfaces for a user to stimulate a brainstorm and record the results from the brainstorm. The most common interfaces include map, comparison chart, list, and Venn diagram. The module also provides interfaces for a user to search database and Internet and to display the searched results. Through proper interfaces by the module, a user can write down whatever occurred in his or her mind in words, special symbols, and figures.

The idea organizer module 307 organizes the ideas generated in the idea stimulator module 306 into categories and displays ideas in various forms so that a user can examine ideas from different aspects systematically. This module can provide an interface for a user to define a partition with several categories for organizing ideas. Since one form may be more useful than other forms for a particular purpose, the module also provides an interface for a user to transfer one form to another form. One example is to organize ideas according to space, time, or other relations defined by a user.

The idea modifier module 308 provides an interface for a user to modify the ideas created by the idea organizer module 307 to make them more smooth, nature, reasonable, and complete according to rules for enhancing ideas. A rule for enhancing ideas can be a simple one or a complex one. A simple rule can just require to list synonyms and antonyms of a word in an idea or to list words in a same category of a word in an idea. A complex rule can require candidate words to meet several different requirements simultaneously. According to the rules, the module will find related words and phrases, list them in proper category, and indicate the relations between them and corresponding words in existing ideas for reminding a user about possible ways to look at the ideas from different aspects and make these ideas more complete. The module also provides an interface for a user to search information from database and Internet. From the searched results, the user can select the interesting portions, modify them, and insert them into existing ideas. Through the interfaces provided by the module, a user can do various editing works such as adding, copying, moving, deleting, and modifying.

The structure developer module 309 provides interfaces and helps a user to develop structures. Though a structure here is not a data structure commonly seen in a computer science, one can define a data structure to represent the structure. If one prefers objective-oriented approach to implement the system, one can further define a class to represent the structure by adding related functions to the data structure.

Figure 15:
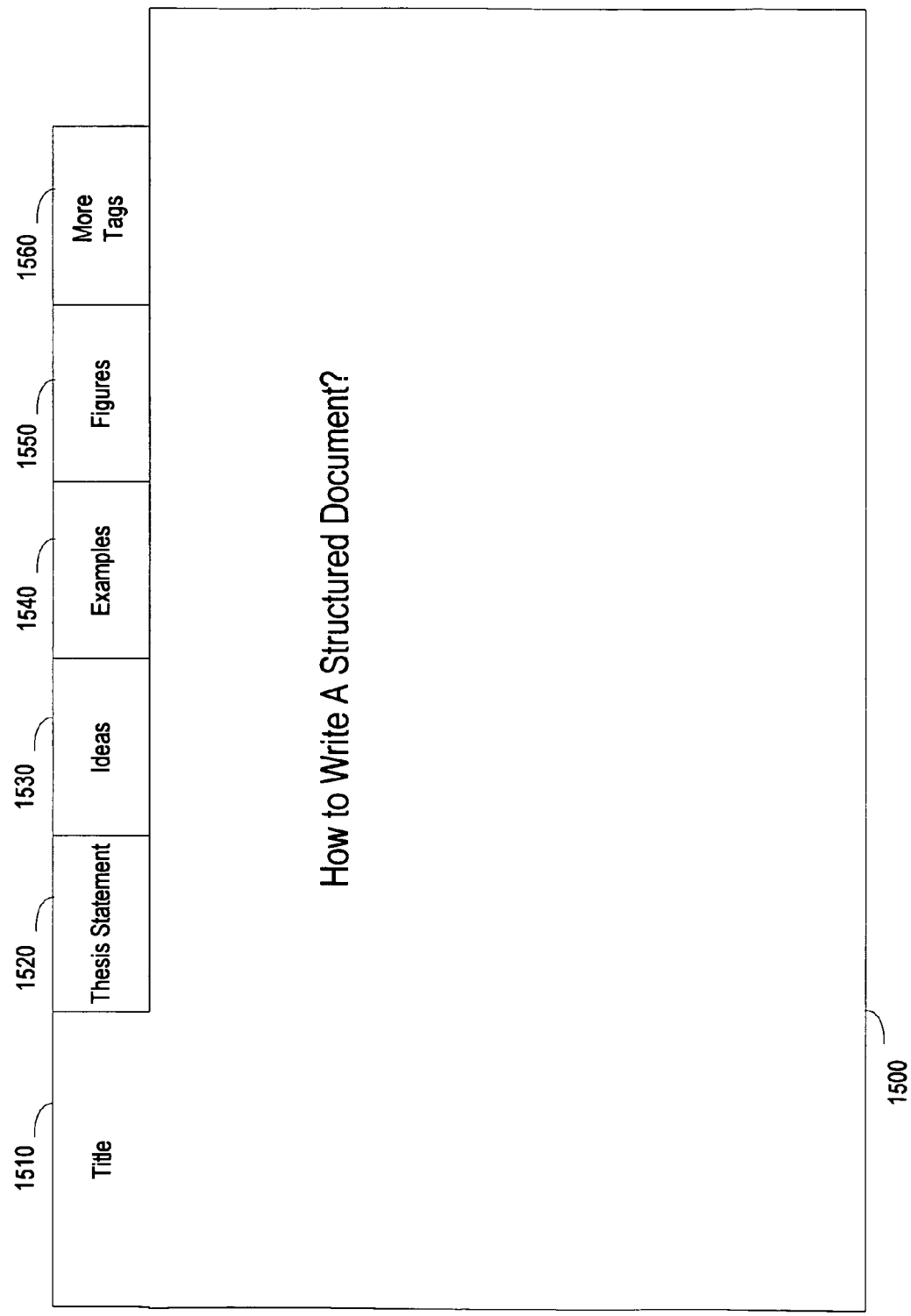
FIG. 15 illustrates an exemplary display form created by the structure display module 313 in FIG. 3.
Figure 16:
FIG. 16 illustrates another exemplary display form created by the structure display module 313 in FIG. 3.

A structure is an organization of information with various marks to label or to hold corresponding portions of information. Since a regular document may contain some components such as title, sub-titles, sections, subsections, and paragraphs, some people may consider it as a very simple structured document. However, the present invention will not consider it as a structured document. There are at least six major differences between a regular document and a structured document First. usually a regular book has no clear indications of which portions are title, sub-titles, sections, subsections, and paragraphs. Second, though people could notice a title or a sub-title on a regular book easily, a computer has to perform some pre-processing in order to recognize each component on a regular book. Third, on a regular book these components are not organized according to reader's reading preferences. Fourth, on a regular book it is very difficult to authors to provide reading suggestions for each reader categorization. Sixth, a regular document contains no information to produce a proper structure desirable for helping readers to read. Therefore, in order to distinguish a regular document from a structure document in a sense according to the invention, the invention will not consider a regular document as a structured document. A more complex structure has these marks associated with properties for holding corresponding information. These properties can further associate with rules for guiding the system to process related information. For a structure having a lot of information, one can further divide the structure into a set of substructures and make the structure to have several layers. Since a tag form as shown in FIG. 15 or FIG. 16 is one of the most effective ways to display the information in a structure, one can call these substructures as tags for convenience. A tag is a substructure that labels or holds corresponding portion of information with one or more properties. A tag can also associate rules for processing related information in the tag or one of its properties. Moreover, a tag can be designed for a particular type of information and for particular information.

The structure developer module 309 helps a user to develop a structure. First provides interfaces for a user to select one or more related structure templates and to create new structure templates. A structure template is an exemplary structure that has various tags for holding particular types of information and has default rules associated with it and its tags for handling related information. Second, the module 309 can create a structure by following the example of one of the selected structure templates, extracts related information, processes the extracted information according to associated rules, and fills the structure and the its tags with the corresponding information. The module also provides an interface for a user to add more properties, delete some properties, and modify some properties of a structure and its tags. For example, the system can fill a structure and its tags with information such as title, author, thesis statement, sections, paragraphs, topic sentences, key points, and examples according to prearrangement or related rules. Third, the module 309 further provides interfaces for a user to modify information associated with various properties at structure level and at tag level and for a user to supply new information to fill properties unspecified. Depending on the general setup of the module, the general rules for developing a structure, the specific rules for a particular structure and its tags, and the properties associated with that structure and its tags, the module 309 can guide a user to provide information systematically. Fourth, the module 309 also provides interfaces for a user to search information from database and Internet, to perform spelling and grammar check, to display similar words and confused words, and to show rules of good writing style. Finally, the module 309 detects sentence patterns, suggests possible variations, display good examples and bad examples, and provides advises on edit and revise.

The structured document maker module 310 provides interfaces for a user to generate a structured document for target audience from a structure or several structures. Created from a structure, a structured document contains information and rules in the structure, suggested methods to deliver information to target readers, and the way to recover the organized information. This module lets a user to specify which properties and tags will be available and to provide suggested methods for delivering information to each type of target audience and a same type of target audience at a different stage. A structured document can have one of several predefined formats. One format is a text-based document with embedded marks to indicate tags, their contents, the default display forms, and related rules. An embedded mark can be one predefined in the system or one customarily defined by a user beforehand. If the mark is a customized one, there should include specification for recognizing the mark and indicating related information such as suggested interfaces and utilities. Without displaying the embedded marks and related instruction for recovering organized information, a structure document in this format will look like a regular document. Another format is to separate tags, their contents, the default display forms, and related rules in a structure by one or more predefined symbols in a way similar to the format in a text file obtained by exporting a particular record of a database. One of the most commonly used symbols is "|". Furthermore, the module 310 can provide an interface for a user to create a compound structured document from several structures. Here a compound structured document is a structured document containing information from several structures with overlapped information removed.

The structure analysis module 311 analyzes the configuration of an input document. The configuration can include title, author, journal name, section, paragraph, sentence structures, and other interesting categories of information. The module 311 can identify the sentence structures and speech parts of the input documents and include procedures to find out the relations among sections, paragraphs, and sentences. Further, the module 311 can derive information from the input document according to the information extraction rules associated to a structure, its tags, and a particular type of document. In addition, the module 311 will fill the structure and its tags with corresponding information extracted.

The structure modification module 312 provides interfaces for a user to modify a structure, its tags, and the associated rules. Through a proper interface, a user can modify all the similar properties of many selected tags simultaneously or to modify properties of a particular tag one by one and then to modify tags of a particular structure one by one. A user can perform various operations such as copying, moving, deleting, and modifying on the information and properties associated with a structure and its tags.

The structure display module 313 provides interfaces for a user to select one or more forms to display information. Depending on document type, setup, preference, special requirement, a particular user, and a particular stage, the module 313 will use one of the available forms to display related information. A user can also select a different form to display information. In addition, a user can hide some information, display some particular information briefly, and display some other information in detail. The module 313 can further provide an interface for a user to search for related information from Internet and database, to define a new display form, and establish links among different display forms.

Figure 18:
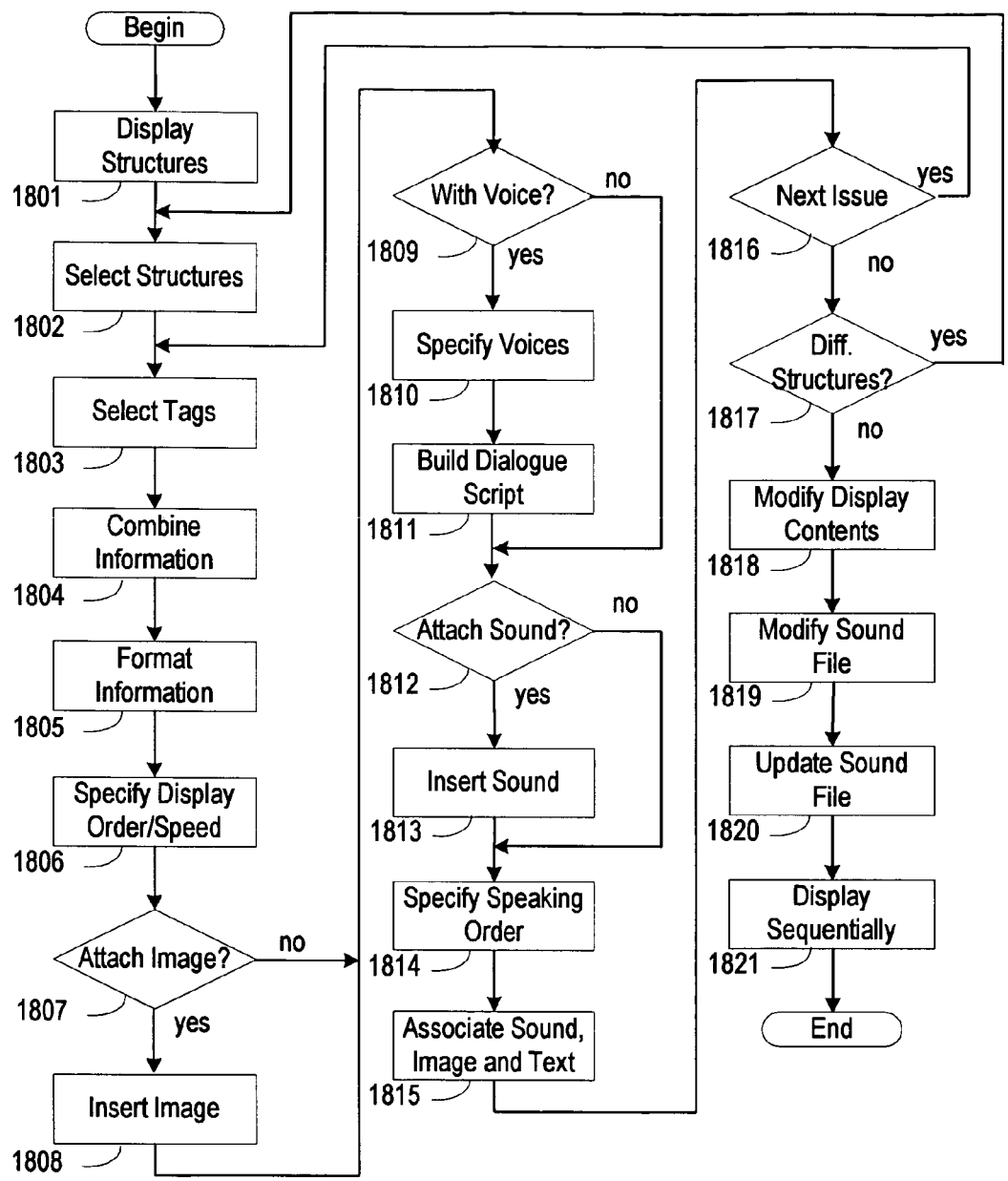
FIG. 18 illustrates an exemplary flowchart of the sequential display module 314 in FIG. 3.
Figure 19:
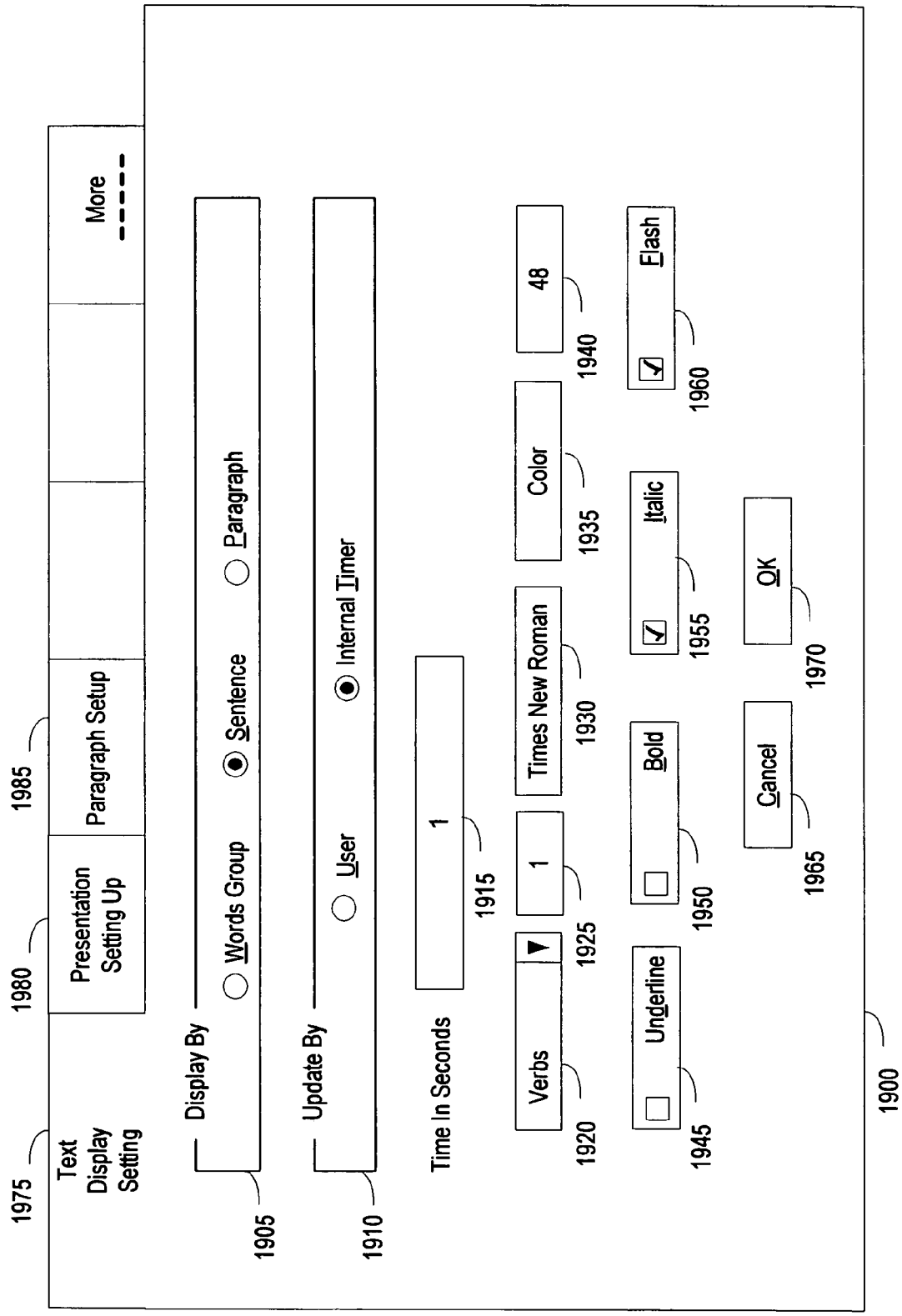
FIG. 19 illustrates an exemplary form for a reader to specify the style for text to be displayed.
Figure 20:
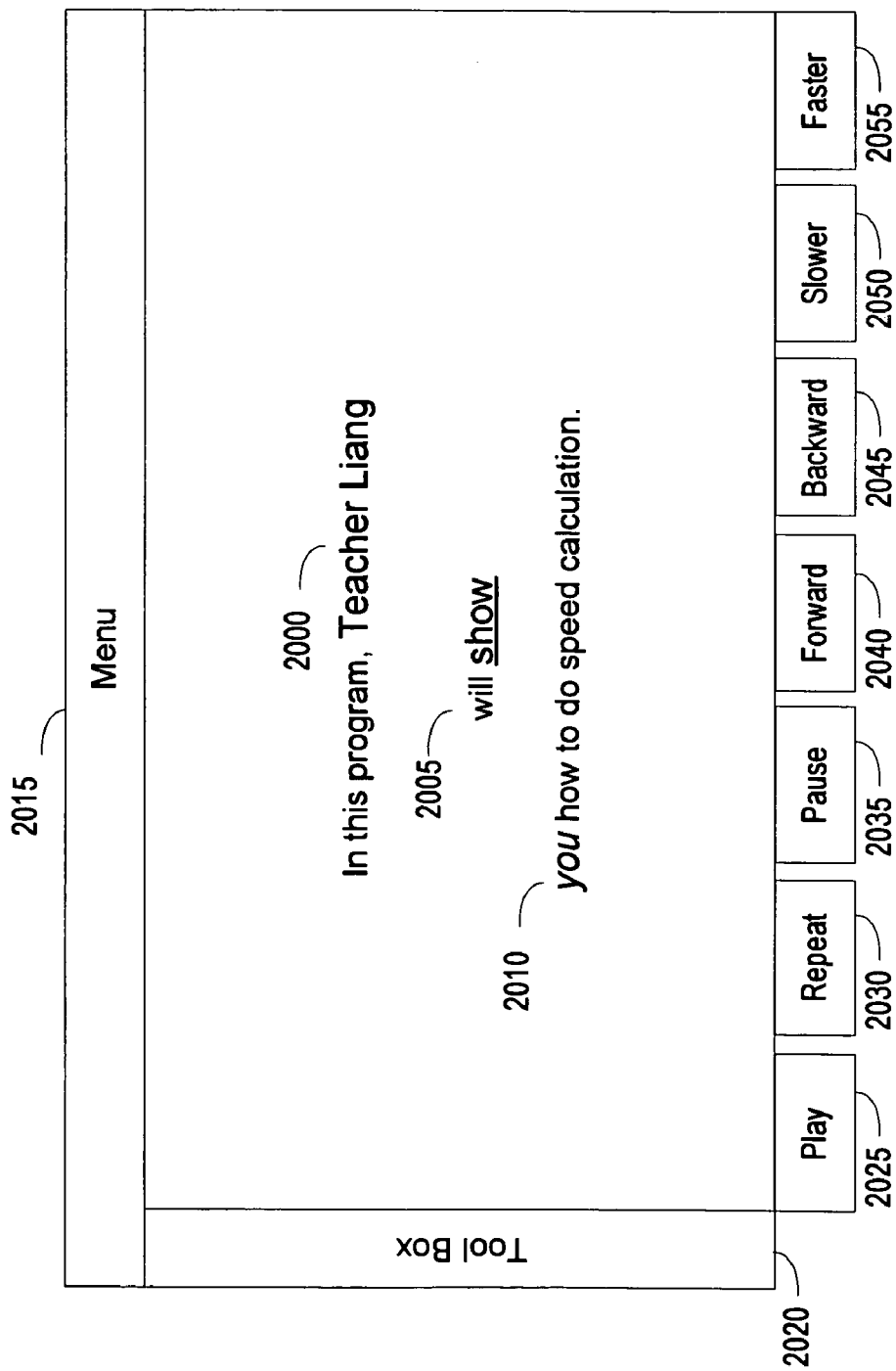
FIG. 20 illustrates an example of displaying information sequentially with different fonts for different sentence structures.

The sequential display module 314 provides a user to access information in a way to similar to regular reading. The module 314 displays the text information contained in a structure by a predetermined order with important information emphasized. Besides text, images and sounds can accompany with the text information. FIG. 18 will show an exemplary flowchart used by the sequential display module 314. FIG. 19 shows an exemplary interface for a user to specify voice features for generating sounds. FIG. 20 will show an example generated by the module 314.

The voice processing module 315 is to synthesize sounds. Since hearing and seeing uses different portions of a brain, the synthesized sound may help a user to identify problems and notice important issues that the user could ignore by reading only. Through the module 315, the system is able to present information to people by reading. The module 315 synthesizes sounds by making using various voice synthesis techniques and providing interfaces for a user to specify voice features and accents associated with particular persons and sentence patterns. Here features include tone, volume, and pace as well as voice quality. This module also provides an interface for a user to specify voice features under a normal condition, voice features under a special condition, and the rules for introducing some variations. The module 315 further provides an interface for a user to specify the special requirements on particular sentences. According to the specified voice features, special requirements, and related sentences, the module will create sounds from texts correspondingly.

The database management module 316 keeps information organized in a database and provides an effective way for a user to search, organize, and display the data in the database. The module 315 provides an interface for a user to specify a search criterion. Then the module will start searching the database according to the search criterion and display the searched results. For example, after a user specifies keywords contained in a virtual card and the relations among these keywords, then the module 316 will search for all virtual cards and display the virtual cards containing the keywords and satisfying the relations. The information collected by the database includes the information collected by a user, the information about a user, various document types, various structure templates, various tag templates, and various rules.

Figure 5:
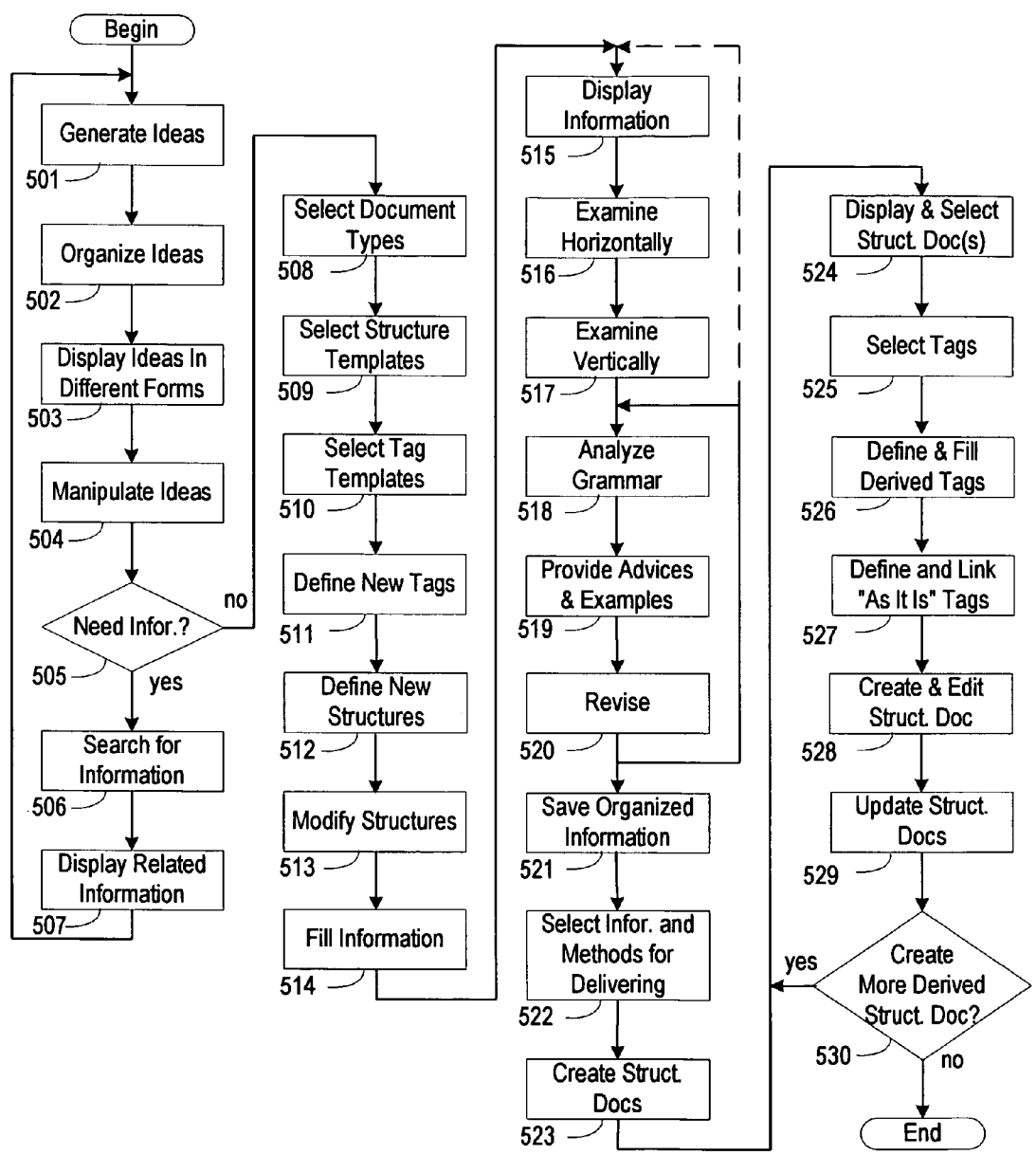
FIG. 5 illustrates an exemplary flowchart used by the writing aid subsystem 110 in FIG. 1.

The writer workshop module 317 has a window interface for a user to perform various writing related tasks by providing shortcuts and displaying the most commonly used tools and utilities. Consisting of menu items, tool bars, or key shortcuts, the module 317 can call the information collector module 305, the idea simulator module 306, the idea organizer module 307, the idea modifier module 308, the structure developer module 309, and the structured document maker module 310. The module 317 can also call the database module 316 for saving and retrieving information and call the rule management module 319 for editing rules for executing, editing, and managing a rule. When a user starts the writer workshop, the module 317 will use the setting specified by the user for current session or the last setting used by the user in a previous session. The module 317 can further support multiple documents so that a user can work on several documents simultaneously with each document having a particular setting. FIG. 5 will show an exemplary flow chart of the module 317.

Figure 6:
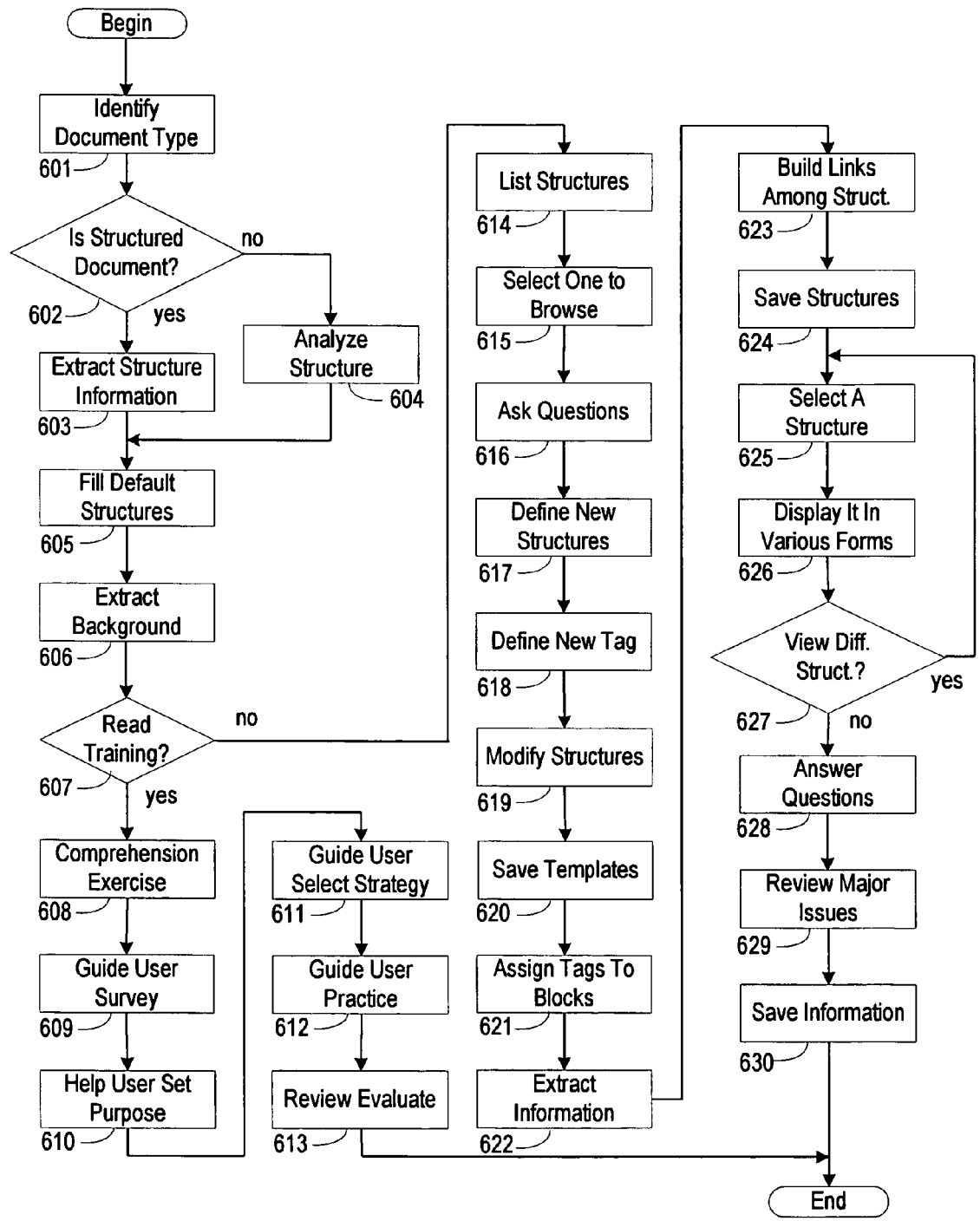
FIG. 6 illustrates an exemplary flowchart used by the reading aid subsystem 120 in FIG. 1.

The reader workshop module 318 also has a window interface for a user to perform various reading related tasks by providing shortcuts and displaying the most commonly used tools and utilities. Consisting of menu items, tool bars, or key shortcuts, the module 318 can call the preprocessing module 304, the structure analysis module 311, the structure modification module 312, the structure display module 313, the sequential display module 314, the voice processing module 315, the database management module 316, and the rule management module 319. The module can also support multiple documents so that a user can read several documents at the same time with a corresponding setting for reading each document. The module 318 can further assist a user to generate questions, to establish reading goals, and to review, extracts information, organizes information, displays information, and provides various helps. FIG. 6 will show an exemplary flowchart of the module 318.

The rule management module 319 provides interfaces for a user to search, display, modify, register, and test rules. It would be perfect if one can define all procedures for extracting information, for modifying information, for displaying information, and for organizing information in advance. However, sometimes even though it is not impossible, it is very difficult and takes a long time for a user to define a procedure to deal with all possible cases beforehand. Therefore, instead of defining a perfect procedure at very beginning, a better choice is for a user to define a rule for a task, register the task or register the rule, and gradually refine the rule. A rule can be in form of regular expression, formal language, macro, example, procedure, subroutine, or some special language designed specifically for dealing with various processing involved in the system. Since one purpose of introducing a rule is to provide flexibility to handle a complex task, which may require a different procedure for handling a different situation, a rule usually associates with its corresponding object such as a document type, a particular document, a property, a structure, a substructure, a display form, and other rules. For convenience, a rule may further associate an explanation and a comment. A rule may have one or more executable forms with each one being convenient for handling a special case.

Figure 7:
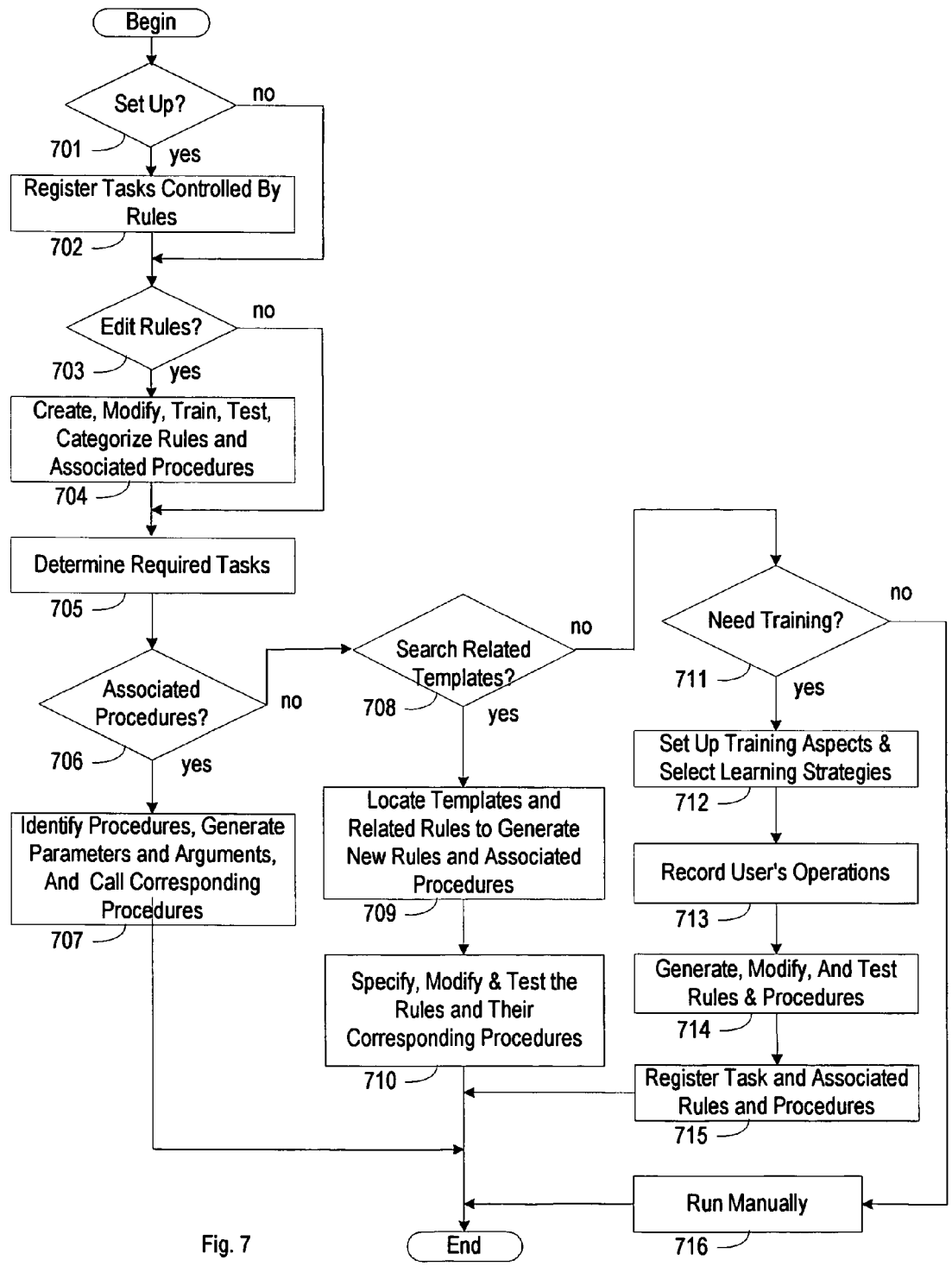
FIG. 7 illustrates a general flowchart for the rule management module 319 in FIG. 3.

The rule management module 319 provides interfaces and utilities to perform various operations specified by a rule. Through the interfaces, a user can search, display, modify, register, and test a rule. The utilities will interpret a rule according to user's preference, setup, and available resources and then execute the rule. The most common rule operations include splitting a rule into several sub rules with each sub rule for a special case, merging several rules into a single rule, adding a new rule, removing an obsolete rule, and editing a rule. FIG. 7 will show an exemplary flowchart of the module 319. Some rules are for a specific property, a particular display form, a particular tag, a particular structure, and a particular rule only and some rules are for a category of properties, a category of display forms, a category of tags, a category of structures, and a category of rules. In case of conflict, rules more specific will override rules more general.

The rule management module 319 can display rules that satisfying particular requirements and provide interfaces for a user to specify how to display and run a particular rule. A user can define many different partitions and separate rules into many categories for each partition. Here are some examples. According to the object that a rule will apply on, a user can separate rules as system rule, document type rule, structure rule, tag rule, idea rule, property rule, rule's rule, etc. According to the purpose of a rule, a user can separate a rule into format rule, displaying rule, identification rule, extraction rule, modification rule, grammar rule, revision rule, association rule, accessing rule, organization rule, execution rule, digging information rule, evaluating background rule, extracting background rule, warming up rule, survey rule, reading purpose rule, review rule, saving rule, relation rule, etc. According to if a rule is for a particular purpose or for general, a user can separate a rule into default rule, session rule, topic rule, simple rule, complex rule, etc. The module can also provide interfaces for a user to define a display form and an execution method for a particular rule or for a particular category of rules.

The image processing module 321 is to generate an image from a picture on original document or to provide interface for a user to build an image from scratch. The module 321 can also provide interface for a user to modify the image, such as to make it simpler, to make it funny, or capture the characteristics. The module 321 can further let a user specify when, where, and how to display the images. After linking images to corresponding portions of information, properties, and rules, the system can give a user a deeper impression by displaying the images while presenting text information.

The logout module 322 saves the results and current setting when a user logs out. The system will use these results and setting to recover a previous working environment.

FIG. 4A to FIG. 4E show the exemplary components associated with a document type, a structure template, a particular structure, a tag template, and a particular tag. In an actual implementation, a person can define more or less components, combine some of these components, or split a component into several components. Further, a person skilled in the art can adopt an object-oriented approach to build the system by defining properties and associated functions in form of classes.

Figure 4A:
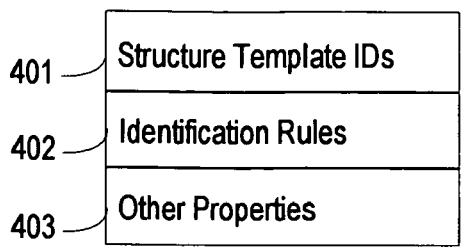
FIG. 4A illustrates the basic components of an exemplary data structure associated with a document type.

The basic components associated with a document type, as shown in FIG. 4A, include the default structure template identifications 401, the identification rules 402, and the other properties 403. For the documents under a same document type, a user usually wants to process these documents and display their information in similar ways. A user can define a default way to handle a particular document type. The structure template identifications 401 specify the default structure templates suited for a particular document type. Here a structure template is a structure with only the properties and related rules left and with all instance specific information removed. The identification rules 402 specify how to identify if a document belongs to the particular document type. The other properties 403 contain information specific to the particular document type.

Figure 4B:
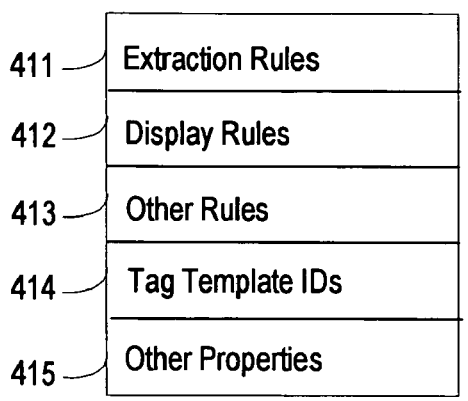
FIG. 4B illustrates the basic components of an exemplary data structure associated with a structure template.

The basic components of a structure template are the default extraction rules 411, the default display rules 412, other default rules 413, the tag template identifications 414, and the other properties 415 as shown in FIG. 4B. A tag template is a tag with only the properties and related rules left and with all instance specific information removed. A user can build a structure according to one or more structure templates. The extraction rules 411 are the rules for collecting information from a user and extracting information from an input document, a database, and Internet. The default display rules 412 specify the default display forms associated with a structure built from the structure template. A structure can have one or more default display forms with each one for a particular purpose. The other rules 413 are rules specific to the structure template. The tag template identifications 414 specify the default tag templates used for building a structure according to the structure template. A structure can have zero, one, or more tags built from each tag template. The other properties 415 contain information specific to the structure template.

Figure 4C:
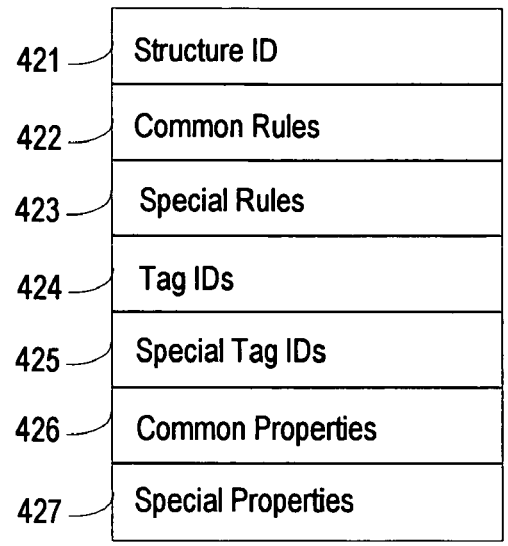
FIG. 4C illustrates the basic components of an exemplary data structure associated with a structure.

FIG. 4C shows the basic components contained in a structure. A user can build a structure according to a structure template and then add new rules and special properties to the structure. The structure identification 421 specifies the name of the structure. The common rules 422 contain all the rules inherited from related the structure template such as extraction rules and display rules. Through interfaces provided by the system, a user can modify the rules if necessary. The special rules 423 are rules created specifically for performing specific tasks involved in the structure. A user can also build rules from scratch directly by specifying that what information the user want to contain, how to collect related information, and how to process the information. The tag identifications 424 link to the tags created from tag templates. The special tag identifications 425 point to the tags created for the structure specifically. The common properties 426 are properties inherited from the properties in the structure template. Default setting and default procedures or rules associated with these properties will determine the values of these properties. A user can further modify these values. The special properties 427 are the properties created specifically for the structure. These properties can have some associated rules to instruct the system to perform various tasks. A user can also build these properties directly from scratch and assign related rules to these properties. In case of conflict, the specific rules and the specific properties will override the general properties and the general rules respectively.

Figure 4D:
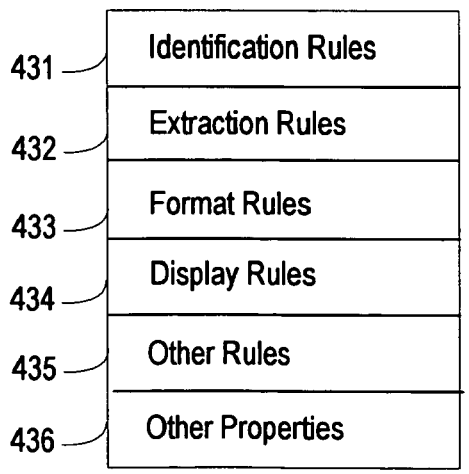
FIG. 4D illustrates the basic components of an exemplary data structure associated with a substructure template called as a tag template.

FIG. 4D shows the major components associated with a tag template. The identification rules 431 tell the system what information a user wants to collect and how to identify the information. The extraction rules 432 specify how to extract information from an input document, database, and Internet as well as a person, how to modify the information, and how to organize the information. The format rules 433 specify how to create formatted information from the extracted information. The display rules 434 specify how to display the formatted information. The other properties 436 specify the common properties of tags built from a tag template.

Figure 4E:
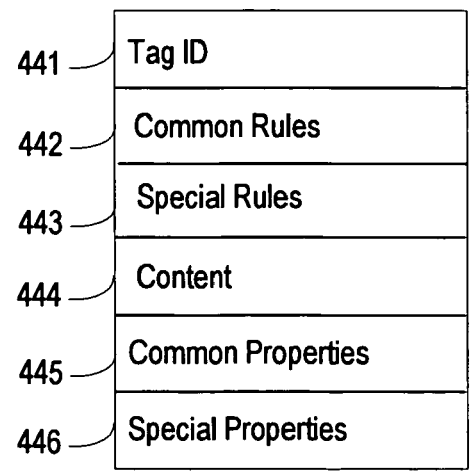
FIG. 4E illustrates the basic components of an exemplary data structure associated with a substructure called as a tag.

FIG. 4E shows an exemplary tag. First, the tag has a tag identification 441. A different tag has a different identification. If a tag is built from a tag template, then the tag can have common rules 442 inherited from the tag template. The common rules 442 include the identification rules, extraction rules, format rules, and display rules. A user can also add some special rules 443 for the tag to perform various tasks specifically for the tag. The content 444 holds information. The common properties 445 are the properties inherited from a tag template and have different values for different tags. A user can also add some specific properties 446 for the tag. Through interfaces provided by the system, a user can modify properties, rules, and content. If a tag has no any associated rules, the fields for common rules 442 and special rules 443 will be empty. One example for a tag without any rules is an as-it-is tag for holding information assigned to the tag.

Depending on setups and general preferences, the interface and control module 302 will control the actual configuration of the writing aid subsystem 110 as shown in FIG. 1. An exemplary flowchart of a writing aid subsystem in FIG. 5 illustrates the major steps of the writing aid subsystem 110. This flowchart will call some functions in related modules of FIG. 3. First, the system provides interfaces for stimulating, organizing, displaying, and manipulating ideas and for searching related information from database and Internet. Then the system provides interfaces for a user to specify document types, to load associated structure templates, to define new tag templates, new tags, and new structures, to modify structures and their associated tags, and to fill information. In addition, the system performs grammar analysis, provides interface for a user to examine from various aspects, and offers advices for a user to revise. Moreover, the system creates a structured document by providing interfaces for a user to specify which portion of information will be available and how to deliver the information to each category of readers and each reading stage. Further, the system provides interfaces for a user to define a derived tag from several existing tags, to define an as-it-is tag by assigning related blocks to the as-it-is tag, and to modify the structured document. Depending on the setting, a derived tag can keep original information or change its information correspondingly when the related tags change. The system performs various tasks according to the rules associated with a document type, a structure, and a tag directly and indirectly.

At step 501, the system provides an interface for stimulating a user to generate ideas. The interface can have many different forms such as mapping, branching and egging, and comparison list. By selecting a desired form, a user can make free associations, create branching eggs, and do free writing conveniently. The system can also provide an interface for a user to specify the default idea stimulating forms and the default rules for categorizing ideas for a particular document type.

At step 502, the system sorts the generated ideas at step 501 according to default preferences, user's setups, and organization rules. A user can organize ideas by selecting some predefined organization rules, modifying existing organization rules, and creating new organization rules and by assigning related properties to the ideas to have specific control on organizing ideas. Further, a user can define an organization rule according to a particular relation such as similarity, contrast, and comparison. According to an organization rule, the system can classify an idea by identifying the properties associated with the idea and the characteristics contained in the idea. In case there is any conflict among organization rules, a user can define the relative priority for each of the related organization rules. An organization rule can be temporary for display purpose only without affecting any related structure. A very special temporary rule is an as-it-is rule for a user to group a set of related ideas together. By categorizing ideas according to various organization rules, the system will help a user to examine the ideas from different aspects, study all the ideas under a particular category simultaneously, and check a same idea under different categories.

At step 503, the system displays ideas in various forms so that a user can examine the generated ideas from various aspects. The system provides interfaces for a user to specify some predefined forms and to create new forms if the user wants. A user can also change from one display form to another display form. By viewing an idea from many different points of view and examining all the generated ideas under a same category, a user may find some new clues, new connections, and new ideas.

At step 504, the system provides an interface for a user to manipulate ideas. By listing related ideas and examining them from different aspects, a user may find places where the user can modify or improve. A user can remove a duplicate idea and a non-important idea, add a new idea, make an idea complete, moving an idea from one place to another, deleting an idea, adding a new idea, etc. A user can further link examples to related ideas and supply new examples to corresponding ideas through proper interfaces provided by the system. Being different from step 503, which enables a user to modify and to display ideas for purpose of organization and brainstorming, step 504 enables a user to specify the relations among ideas and modify ideas for better connection.

At step 505, the system checks that if a user wants to have more information. If yes, go to step 506 and otherwise go to step 508.

At step 506, the system helps a user to search for information from a database and Internet. The system provides interfaces for a user to specify search criterions, organize outcome, and save results. Depending on settings, a user can search either the database or Internet for information related to a particular subject, a particular category, a particular keyword, a particular example, and a particular fact with logical combination of various search criterions. The system can further provide interfaces for a user to modify results, organize them in various ways, and save the organized results in the database.

At step 507, the system displays the search results in proper forms. For example, when a user wants to search for data from a database, the system can provide a window interface with data organized under different categories. When a user clicks a particular category, the virtual card box will appear. From the virtual card box, the user can select a particular virtual card to retrieve its information. The system can further provide links among forms, dynasets, and Internet webs.

The steps from 501 to 507 can repeat as many times as a user desires. Usually a user may want to generate more ideas and examples than the final document actually needs.

At step 508, the system provides interfaces for a user to select the possible document types. The system can also provide interfaces for a user to define new document types. Each predefined document type can associate with several predefined structure templates and each predefined structure template can associate with a plurality of predefined tag templates. The system lets a user build structures and tags from a structure template and a tag template correspondingly.

At step 509, the system provides interfaces let a user select the structure templates, remove unwanted structured templates, modify existing structure templates, and adding new structure templates.

At step 510, the system provides interfaces for a user to define new tag templates and modify existing tag templates.

At step 511, a user can define new tags from corresponding tag templates or from scratch. The properties and rules associated with a tag will help the system to prod information from a user, extract information automatically, organize information, and display information.

At step 512, a user can define new structures either from corresponding structure templates or from scratch. The properties and rules associated with a structure will help the system to dig information from a user, extract information automatically, organize information, and display information. A user can add or link tags to the structure.

At step 513, the system provides interfaces for a user to modify the selected structures and their associated tags. A user can modify the default way for displaying a structure, rearrange tags, build links among tags, add new tags, remove undesired tags, establish links among structures, create links among display forms, etc.

At step 514, the system provides two methods for filling information. The first one is automatic. Depending on the properties, the rules associated with selected document types, structures, and tags for loading information as well as user's setting, the system can link or copy the related information to corresponding structures and their tags. A user can define a rule for loading information by specifying what information a structure and its tags are looking for, what properties an idea should have, and what characteristics a search result should contain. The related information includes the ideas and the search results generated from step 501 to 507. Some properties associated with the structures and their tags may provide the indication about what kind of information they need, what formats the information should have, what features the information should contain, etc.

Another method is to fill information manually. The system provides interfaces, proper questions, and necessary helps for a user to supply information manually. While the information filled automatically may lay down the background and framework, the information to be filled manually is more important in many situations. A particular document type may associate with preferred interfaces, questions, and helps; a particular structure may have close relation with some interfaces, specific questions, and special helps; and a particular tag may have favored interfaces, questions, and helps. If a structure or a tag has default interfaces, questions, and helps for guiding to fill information, the system will loads corresponding interfaces, questions, and helps from a database for helping a user to supply information. The interface for collecting information can be in many different forms. For instance, the system can give verbal questions and capture a user's verbal acknowledgement or the system can display questions in text and provide a text area to capture user's feedback. Some questions and helps can be more general and some questions and helps can be more specific. The system also allows a user to provide information as it is and modify information.

Depending on setting, the system can provide different procedures for a user to fill information. The system can provide interfaces for a user to supply complete information for one tag then for another tag. The system can also provide an interface for a user to fill partial information for one tag, partial information for another tag and then more information for the first tag, and more information for the second tag. Further, the system can provide an interface for a user to fill information by merging these two approaches. A user can start filling information according to depth-first filling strategy or width-first filling strategy or a combination of these two strategies. The first example is about depth-first filling strategy. When a user is going to write a paragraph, the system provides proper interfaces for the user to select an idea from the ideas developed earlier and displays the related examples of the selected idea. Then the system provides interfaces for the user to fill the topic sentence and supply each example with its details. Finally, the system lets the user specify the conclusion as well as transitional phases through proper interface. The second example is about width-first filling strategy. The system provides interfaces for a user to fill the topic sentence for each paragraph, to fill the details for each example, to provide conclusion for each paragraph, and then to link different argument points in a same paragraph with proper transitional words and phrases.

At step 515, the system displays information in various forms so that a user can examine from various aspects. Linked to related structures and tags, these forms display information from corresponding structures and tags. With structure filled with corresponding texts, figures, and formulas, a user can further check if anything improper and make necessary adjustment. The system can also provide an interface for a user to create a new display form.

Different users may prefer different ways to examine information and even a same user may prefer different ways to examine information under different stages and for different document types. The system can provide various ways with each one designed for a specific examination method. There can be top to bottom method, bottom to top method, display information with specific features, etc. The most commonly used methods will be horizontal examination method and vertical examination method. Upon requirement from a user, the system can switch from one form to a different form to examine a structure.

At step 516, the system provides an interface for a user to examine a structure horizontally and modify arrangement. For example, the system can list the subtitles of all sections simultaneously so that a user can compare them easily; and the system can display the topics of all paragraphs together and provide convenience for a user to find their relations and adjust them properly.

At step 517, the system provides necessary an interface for a user to examine vertically and modify arrangement. For example, a user can show the topic sentence of a paragraph, the main points, and the supported examples as well as the transitional words simultaneously.

When a user satisfies with overall arrangements, selected ideas, and illustrated examples, at step 518, the system performs grammar analysis by calling grammar analysis procedures or according to grammar rules saved in a database. The grammar analysis has two purposes. First, it helps a user to identify possible spelling errors and grammar errors. Second, it identifies the sentence structures so that system can display sentence structures and speech parts and provide a basis for extracting other information and for offering specific help especially the help related to grammar and style.

At step 519, the system provides various helps for a user to revise according to the grammar analysis results, grammar rules, and style rules as well as sentence examples saved in database. The help can be at different levels. Depending on setting, the system can just mention a particular advice, display some related sentence examples, or provide alternative sentences.

At step 520, the system helps a user to revise. The revise can be done automatically or manually. If automatically, according to revision rules defined in advance, the system will try to evaluate sentences, merge sentences, split sentences, create possible candidates, and replace a sentence with its best candidate. If manually, a user can select one of the improved sentences, deny any change, create a new sentence by following a model sentence, or modify current sentence according to an advice. A user can also insert necessary sentences and add transitional phrases between two sentences or two paragraphs.

A user can repeat the steps from 515 to 520 to refine sentences and arrangement. The user can just repeat steps 518 to 520 to refine the sentences only. The user can repeat steps 501 to step 520 to make major changes.

At step 521, the system saves the organized information into database. The information can include document types, structures, tags, properties, links, specific rules, and display forms. A user can also save some structures as structure templates and some tags as tag templates for building new structures and new tags in the future. The system can save a structure in two ways. The first way will use various predefined symbols to mark various components of the structure and the relations among them. The second way will use default delimiters to distinguish one component from another.

A user may not want all information contained in a structure to release to reader. At step 522, the system provides an interface for a user to specify target audience and reading stages, select structures, and select tags. The system can also provide an interface for a user to create structures from existing structures for delivering information specifically to target audience. The user can further specify the accessing rules for suggesting how a particular type of readers should access information. The accessing rules can include information on how to identify the type of a reader, which stage a reader is currently at, which information that the user wants to show, and how to display information. In this way, the user, who is the author in this case, provides guidance for different types of readers and a reader at different stages on how to access information efficiently according to the author's opinion.

At step 523, the system provides an interface for a user to create a structured document from a corresponding structure or from several structures. The structured document corresponding to several structures is called joint structured document, which contains information for the system to recover all these structures. A very special structured document is a flat document such as a regular document. The structured documents have predefined symbols to mark its components such as properties, rules, and tags or have delimiters to separate different components.

At step 524, the system lists all available structured documents, lets a user select a structured document, and then displays the structures containing in the structured document by various forms. By displaying the information associated with a structured document, a user can examine information from various aspects of a reader to find places for improvement such as vague ideas and unclear examples.

At step 525, the system provides an interface for a user to select tags from the structures in one or more selected structure documents. The system can also provide an interface for a user to create new tags from existing tags in one or more structured documents. These tags will be used to construct a new structure and generate a new structured document.

At step 526, the system provides interfaces for a user to define and fill derived tags. A derived tag is a tag whose information is from one or more existing tags in one or more structured documents. The user can specify the properties and rules associated with these derived tags. The derived tags will then hold information from several tags directly by copying related information or indirectly by linking to related information.

At step 527, the system provides interfaces for a user to define and fill as-it-is tags. An as-it-is tag contains information assigned to it. A user can use as-it-is tags to hold information that is difficult for a user to define extraction rules for collecting the information or to include information "as it is" without bothering defining extraction rules. For example, a user can fill an as-it-is tag whatever information the user wants the tag holds. An as-it-is tag can associate with some default properties and default rules or associate with no any properties and rules at all. A user can also define properties and rules for an as-it-is tag.

At step 528, a user can create a new structured document and edit the newly created structured document. Derived from existing structured documents, the newly created structure document will be called a derived structured document. A user can simply modify an existing structured document by modifying tags, their properties, and associated rules as well as their associated information.

At step 529, the system updates the structured document, which is either an existing one or the newly created one.

At step 530, the system checks if a user wants to create another derived structured document or examine another existing structured document. If yes, go to step 524 and otherwise end.

FIG. 6 shows an exemplary flowchart of the reading aid subsystem 120 in FIG. 1. Depending on setups and preferences, the interface and control module 302 controls the actual configuration of the reading aid subsystem 120. The flowchart will call some functions in related modules of FIG. 3 to accomplish particular tasks. First, the system identifies the document types, does structure analysis, extracts structure information and background information, builds structures, supplies questions frequently related to particular document type, and provides interfaces for a user to ask more questions. Further, the system provides interfaces for a user to define new tags, modify structures, creates new structures, build links among structures and among tags, and assign blocks of text to as-it-is tags. The system also provides interfaces for a user to display structures in various forms, review issues, update database, and supply answers to some problems. The system performs various tasks according to the rules associated with document types, structured documents, structures, and tags.

Figure 13:
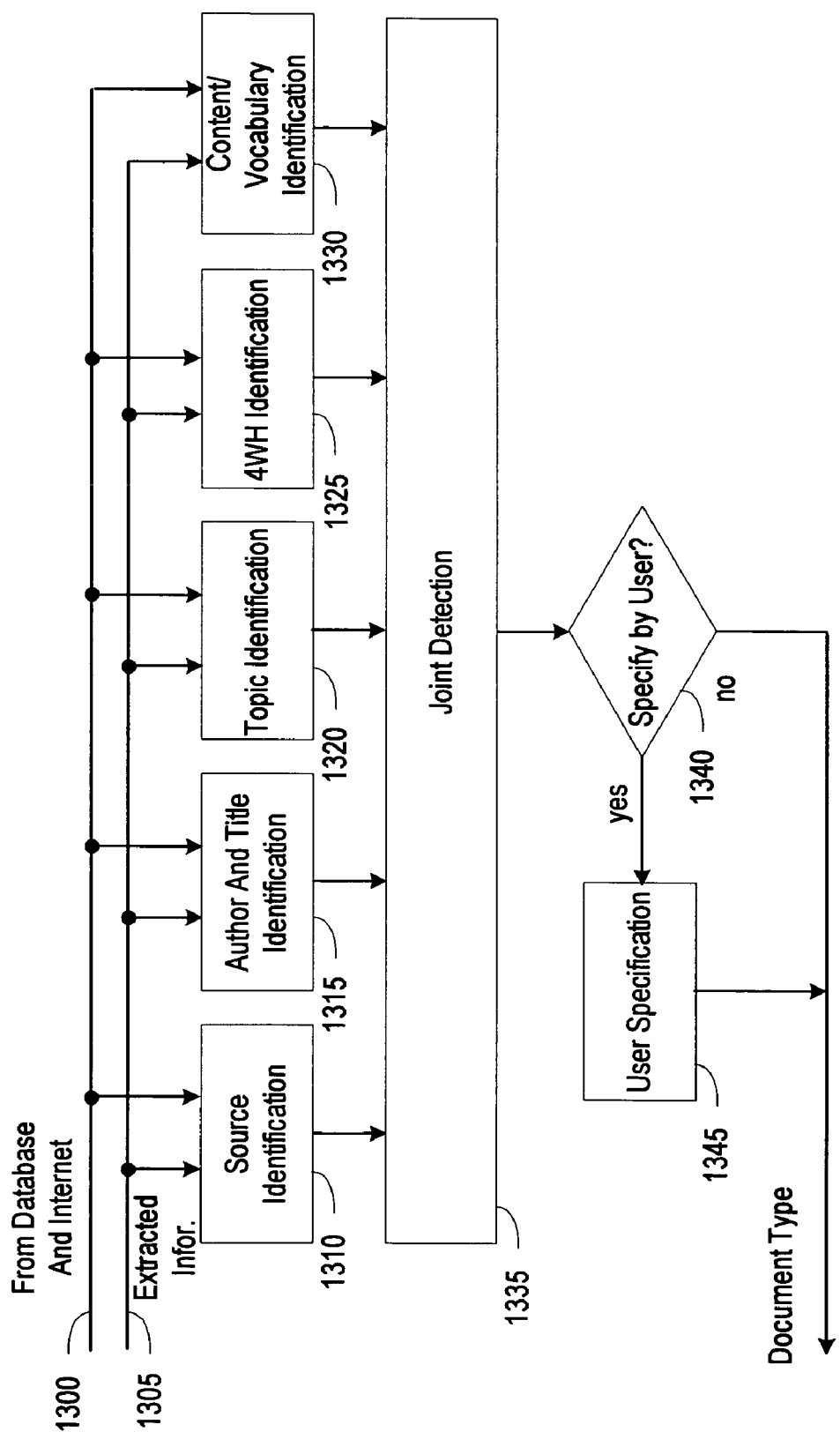
FIG. 13 illustrates an exemplary configuration of the document type identification step 601 in FIG. 6.

At step 601, the system will identify the type of an input document. With the help of database and Internet, the system can identify the type of a document from its source, its author, its title, its abstract, and its vocabulary. FIG. 13 shows how to recognize the type of a document. When the input document is a structured document, the document type may be available on a corresponding property. If a document type has some associated structure templates, the system will load these structure templates from database and use them as a basis to process information further. A document type can associate a structure template with numerous forms for displaying different aspects and a document type can associate with numerous structure templates with each one emphasizing on a particular aspect.

At step 602, the system checks if the input document is a structured document. The system searches for the indicators of a structured document such as the embedded symbols for tags and default delimiters. If yes, go to step 603 and otherwise go to step 604.

At step 603, the system extracts the structured information from the structured document. Since a structured document contains various embedded symbols for marking properties, tags, and rules, or a structured document contains some default delimiters to separate information, the system can recover the structured information according to these symbols or default delimiters.

If the document is not a structured document, at step 604, the system analyzes the structure of the input document. Because the sentence structures can help identifying the meaning of words and phases, objects, and the relations among the objects, grammar analysis will be an important portion of structure analysis. The system can use tags or properties specifically for sentence structures to keep the information about sentence structures. The system can also provide some forms designed specifically to display the sentence structures for various purposes.

Figure 14:
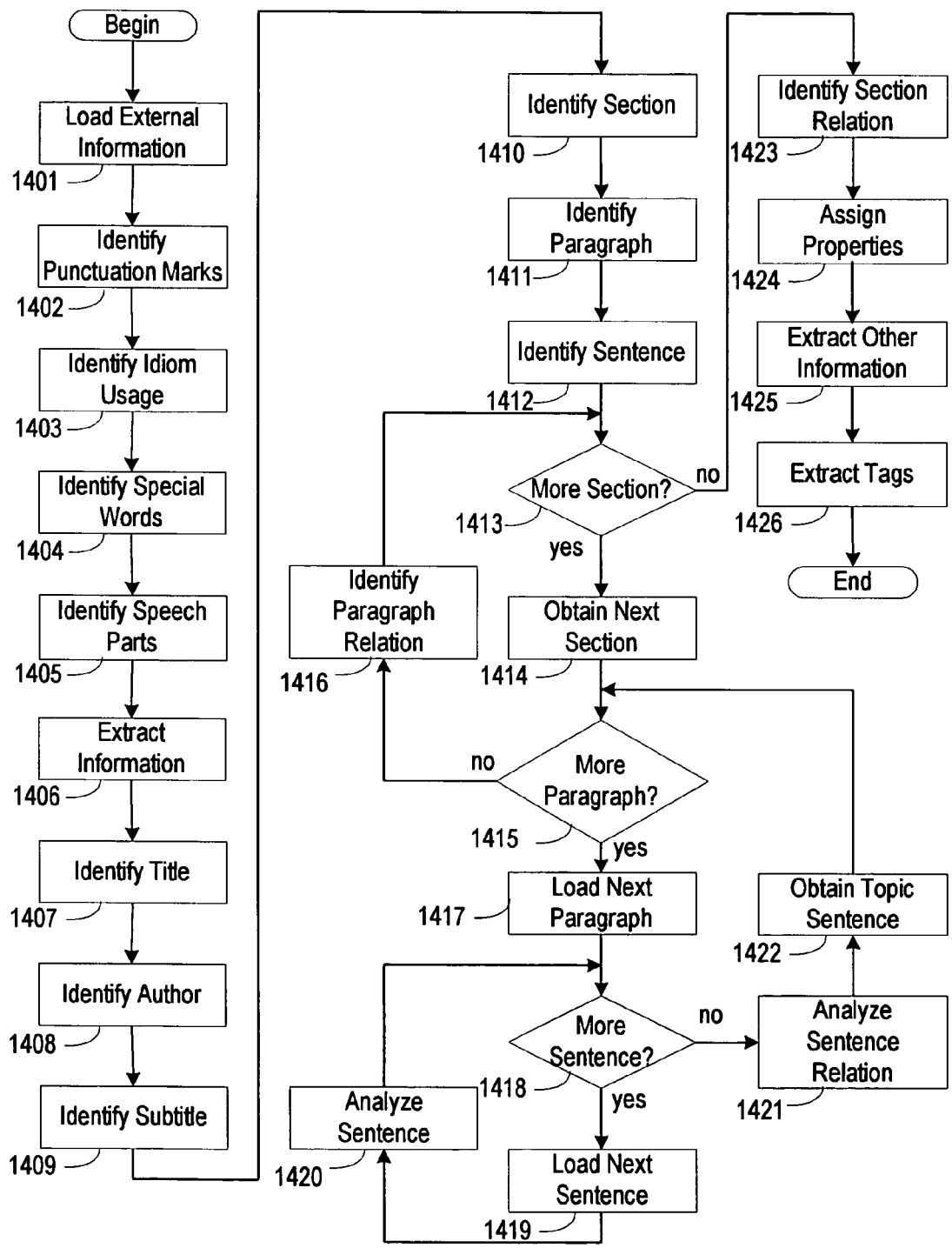
FIG. 14 illustrates an exemplary flowchart of the structure analysis module 311 in FIG. 3.

After extracting the information about sentence structures, the system further extracts other information needed by default tags, default structures, and the possible document types in ways specified by the corresponding rules or setups. The system can find out the grammar information and extract other information by various available methods. One example is shown in FIG. 14.

At step 605, the system rebuilds the original structures from a structured input document and creates new structures from a regular input document according to corresponding structure templates. A user can add new tags and fill these new tags with extracted information.

At step 606, the system extracts information about the background of a user and the background of the input document. The system can load information about the user from database or the system can present a sequence of questions to find out about the user. The system will use the information about the user to set up priority on structures and display forms and to decide if the user is familiar with a particular topic. The system can also extract the background information about the document from database and Internet for providing the user extra information. The system can save and display the extracted information in proper forms. The system performs these tasks according to the rules for digging information from users, evaluating user's background, extracting background information, and displaying information.

A user may want to improve his or her reading capability on regular documents. The system can train the user to master speed-reading skills and to form good reading habits. According to the collected information as well as speed-reading principles, the system can provide interfaces and instructions to show a user systematically how to read a document. With sufficient exercises, a user will master an effective reading method. There are many speed-reading methods such as whole-unit reading method, selective reading method, and vertical eye movement method. The features in these methods can be summarized as filtering contents, no reverse eye movement, separating information into basic contents, selecting the correct reading strategies, no verbal pronunciation, no reading silently, expanding visual scope, focusing, understanding while reading, and changing reading speed according to the contents. The system can further provide interfaces for a user to define and modify various rules on survey, setting up reading purpose, selecting reading strategy, and reviewing and various rules for guiding a user to practice and perform various activities.

At step 607, the system checks that if a user wants to have a read training. If yes, go to step 608 and otherwise go to step 614.

At step 608, the system guides a user to do various exercises so that the user can relax mentally and physically, be able to move eyes faster, be more alert, be able to comprehend better, and be able to remember better. The some exemplary exercises are meditation, imagination, taking imaginary photos, visualizing and dramatize a story, looking at the world in a funny and unusual way, enhancing sensing and understanding capability, utilizing subconscious and potential capability, and grasping ideas directly from text without resorting to pronunciation. Depending on user's background, preferences, setups, and the rules for guiding warming up, the system will decide which exercises will be used, how long each exercise will last, how often a particular exercise should be done.

At step 609, the system guides a user to survey by giving the user instructions, capturing user's feedback, analyzing the feedback, comparing the user's survey with the one generated from the system, alternating expressions, and showing the actual positions if the user fails to locate the information after several tries. The system relies on the survey rules to decide what items should be surveyed, which instructions should be given, and what responses should be expected, how to evaluate user's surveyed results as well as how to generate the alternatives of an instruction, change the survey order, and produce survey results. A structured document saved in a database for training speed-reading may contain survey results on corresponding properties or tags. For a regular document containing no corresponding survey results, the system will find the survey results according to related survey rules. A document type can associate survey rules specifically for surveying and guiding survey this particular document type. Usually a survey covers title, subtitle, author, date, preface, foreword, abstract, introduction, summary, figures, charts, conclusion, table of contents, first paragraph of a section, last paragraph of a section, and chapter reviews. A user can also include some special items in a survey rule for a particular document type. The system can further show the survey process by providing verbal instruction, animating guidance, and text explanation.

At step 610, the system provides an interface and instructions to help a user to set up reading purpose and speculate answers. After survey, a user has gathered a lot of information about the input document. Now the system will help a user to set up a reading purpose according to the collected information and predefined rules for setting up reading purpose. The rules for setting up reading purpose determine what questions will be generated, how to evaluate an answer for a question, and what responses will be expected. A structured document for training speed-reading may contain reading purposes for different readers. First, the system helps a user to review what the user has surveyed, then the system gives the user some general instructions on how to set up reading purpose and help the user to generate questions and provide initial guess on the answers to these questions. One exemplary general instruction is "Please set up your reading purpose by creating questions." The system can provide a user some suggestions according to survey rules, questions, as well as user's feedback. There can be some predefined criterion or rules for finding if a user has difficulty to perform various tasks according to the time taken, number of wrong results, and previous status. Sensing that a user has difficult to form proper questions, the system can provide some stimulating questions such as "What you have known about the subject?" "What is the document type?" "What is the organization of the documents?" "What are your questions?" "What are your guesses?" "Among what, where, who, when, why, and how, which ones are the best ones for describing your concerns?" Further, the system can display specific questions for each survey item and possible answers for each question and then ask a user to select one that the user believes is the best choice. In addition, the system can show the process of setting up a reading purpose by displaying related questions, the answers for these questions, and other related information.

At step 611, the system helps a user to decide which reading strategies will be used. There can be many different reading strategies. Some most popular reading strategies include skim reading, scan reading, study reading, rapid reading, etc., with each one serving a different reading purpose and having a different requirement. First, the system decides which one is good for a user at particular stage according to rules for setting up reading strategy. Then, the system provides interfaces for a user to specify the strategy that the user is going to use. If there is any discrepancy, the system will display the ones generated by the system as well as specified by the user. The system can further display the process of determining a reading strategy and provide an interface for a user to modify related rules. If the reading purpose is to find some literal or factual information, the system will suggest a user to use skim reading. Since skin reading is to search the literal information such as facts from a document by moving one's eyes rapidly to look for a few words. It is good for answering the questions with "who", "when", "where", and "what". If the reading purpose is to interpret and organize ideas, the system will suggest scan reading. Since the scan reading looks for a definite order of information and searches for more details, it is suitable for replying the questions with "how" and "why". If the reading purpose is to evaluate ideas according to their relationships, to arrange facts according to importance, and to make decisions, the system will suggest a user to adopt study reading. Requiring critical thinking to analyze and interpret information, assess situations, and make a decision, study reading is for answering the question involving "how" and "why" and the questions with implicit requirement for explanation. The system can also provide interfaces for a user to specify the reasons why the user chooses a specific reading scheme. One way is to let a user to select possible reasons associated with each reading scheme. The system can also display the reasons for choosing a particular reading scheme according to the rules for setting reading strategy and survey results. The system can further provide a learning mechanics for the system to identify a proper reading scheme according to user's feedback and decision.

At step 612, the system guides a user to do speed reading practice. According to the information extracted, the requirements for displaying speed reading materials, and the related rules about speed reading, the system provide an interface for displaying related portion of the document and gives proper instructions when needed. The system updates information for every predefined time interval or updates information dynamically according to the difficulty of the text portion related to the user. The system can also track user's eye movement and mouth movement to find out if a user moves eyes horizontally or vertically, if a user repeats reading, if a user alters reading speed for different portion of text, and if a user makes verbal pronunciation while reading. The system can further provide an interface to force and train a user to access information by following a general approach. One example of a general approach is to display title, author, year, subject, topics, basic facts, basic opinions, arguments, criticism, and possible applications. The system can check that if a user understands by asking the user questions, capturing user's answers, and comparing user's answers with the ones saved in the system or generated by the system. In addition, the system can remind a user how to read, capture user's input, and emphasize the related information with different fonts. How much system will involve on user's reading depends on setting, related rules, and user's familiarity of the topic and the speed reading process.

At step 613, the system evaluates how much a user understands the document, estimates what progress the user has made on reading skill, and helps the user to review. The system can display a set of questions generated before, generate answers according to extracted information, ask user to answer the question, show user's initial guesses, capture user's post-reading answers, and display the percentage of correctness. The system can also display the related information and the reasoning process so that the user can see details and understand. The system can further save the percentage of correctness, the average number of repeating reading line per 100 lines, the adoption of changing reading speed, and other reading qualities into the database as a snapshot. The system provides user's progress according to two snapshots token at different times. In addition, the system can estimate the effectiveness of the questions generated from survey, the properness of the reading strategies proposed by the user, the time spending on reading a material with similar difficulty. There are related rules to control the extraction and the reasoning process of answers, the effectiveness of questions, and the properness of reading strategies. A user can sort these rules in various ways, display them, and modify them.

If a user does not want to have a reading training, at step 614, the system lists all available structures. These structures are generated from a regular document according to the default structure templates associated with a particular document type or created from the input structured document.

At step 615, the system provides an interface for a user select one of the structures to browse. There can be a default structure for a particular document type. One can specify a structure containing most information, having a similar arrangement as the original document, and associating with a friendly display format as the default structure for browsing purpose. A user can browse the structure by examining horizontally and vertically, expanding a condensed section, condense a flat section, searching for related items, and comparing them. For example, a user can look at the subtitles of all sections simultaneously and to look at topic sentences of all paragraphs under a particular section. If a user is interested on a concept, the system can list all the sentences related to that concept and search for information related to that concept from a database and Internet.

At step 616, the system generates a series of questions associated with particular document type, subject, and topic as well as the selected structures. The system can also provide an interface for a user to ask himself or herself specific questions about the document. These questions let a user aware the general configuration, remind the user the important issues, make the user more alert on related information, prepare the user for absorbing information, and help the user to set up reading purpose and reading strategy.

Beside the structures associated with a document type, a user can also create a new structure for viewing a document. At step 617, the system provides an interface for a user to create a new structure by either modifying an existing structure or building from scratch, to set default values for the properties of the new structure, to design new display forms, and to link proper display forms to the new structure.

At step 618, the system provides an interface for a user to define new tags. Associated with corresponding rules, these tags extract necessary information from the input document, from existing structures, from a database and Internet. A user can create new tags directly from scratch or indirectly by copying an existing tag and modifying. A structure and its tags can associate information extraction rules for extracting information from an input document, a database, and Internet.

At step 619, the system provides an interface for a user to modify the structures. A user can add, delete and rearrange tags, change the default display forms, modify related rules, and redo certain tasks.

At step 620, the system provides an interface for a user to select structures and tags and to save them as structure templates and as tag templates respectively. The structure templates and tag templates are similar to corresponding structures and tags with instances related information removed.

At step 621, the system provides an interface for a user to locate the interested portions of document and attaches as-it-is tags to corresponding portions. These tags have no associated rules for extracting corresponding information and therefore contain information as assigned. Usually an as-it-is tag contains information difficult for a user to define an information extraction rule or contains information that a user just wants to hold temporarily without resorting to any information extraction rule.

At step 622, the system further extracts information from the input document, the collected background information, the information saved in structures. The system performs the task according to the rules associated with new structures, new tags, and modified tags.

There can be some default links among the tags of a structure built from a structure template, some default links among the structure templates associated with a document type, and some default links among the display forms for a structure template. These links will be established when the system builds these structures and creates display forms. A user may want to establish some new links. At step 623, the system provides an interface for a user to build various customized links in a structure, among structures, and among display forms.

At step 624, the system saves the structures. The system can save a structure in a document with various predefined symbols to mark the components in the structure and their relations. The system can also save a structure in a form of record with default delimiters to separate different components in the structure.

At step 625, the system lists all available structures and lets a user to select one of them to study.

At step 626, the system lists available forms for displaying the selected structure. The system can provide an interface for a user to display a selected structure in one form, to change to a different form, and to display the selected structure in several forms simultaneously.

At step 627, the system checks that that if a user wants to examine a different structure. If yes, go to step 625 to repeat steps 425 to 427 and otherwise go to step 628.

At step 628, the system presents a user the questions generated before, asks a user to answer these questions, and captures user's response.

At step 629, the system helps a user to review according to the user's preference and the review rules associated with document type, structures, and tags. The system can also provide interfaces and give instruction to help a user recalling, analyzing, and summarizing. The system can further let a user list initial questions and initial guesses and let a user provide post-reading answers. The system can provide some answers according to rules for identifying answers. In addition, the system can provide an interface for a user to give comments and search for related portions of text.

At step 630, the system saves desired information into a database. Basic facts, main ideas, and user comments can be part of the desired information. Which information will be save and how to save will depend on user's preference, setup, and related saving rule.

FIG. 7 shows an exemplary flowchart of the rule management module 319 for executing and modifying rules associated with document types, structures, tags, and display forms. First, the system provides an interface for a user to specify if a task to be performed by a corresponding rule, by following a template, by learning from a training session, or manually. Then, the system provides interfaces and utilities for a user to edit, modify and test rules and associated procedures. Further, the system identifies corresponding procedures and calls these procedures. If there is no corresponding procedure, the system tries to find a template saved in database for handling a similar task and then the system builds a new rule and its associated procedure according to the template. In addition, the system provides an interface for a user to teach the system that which aspects the user wants the system to learn and how to create rules and procedures by following examples set by the user. Many tasks that can be done manually can also be done automatically by specifying related rules and letting the rules to control the operations involved in these tasks. A rule provides a method to deal with a complex task with flexibility by modifying it gradually.

At step 701, the system checks that if a user wants to specify the tasks to be done according to related rules. For convenience, learning from template, training, and manual manipulation are considered as special rules. If yes, go to step 702 and otherwise go to step 703.

At step 702, the system provides an interface for a user to register the tasks that will be controlled by related rules or will be controlled by the user. If a task has been registered in the system, then the task will be controlled and completed by a corresponding rule or by the user. The register process can be automatic according to default setup, user's preference, and the rule for registration. The rule for registration specifies which tasks will be done according to corresponding rules. If the default rule for registration is to use rules to accomplish corresponding tasks whenever possible, then the system will register all the tasks associated with corresponding rules.

At step 703, the system checks that if a user wants to edit the rules. This step can be involved automatically when any error happens according to rules on when to debug. If yes, go to step 704 and otherwise go to step 705.

Figure 8:
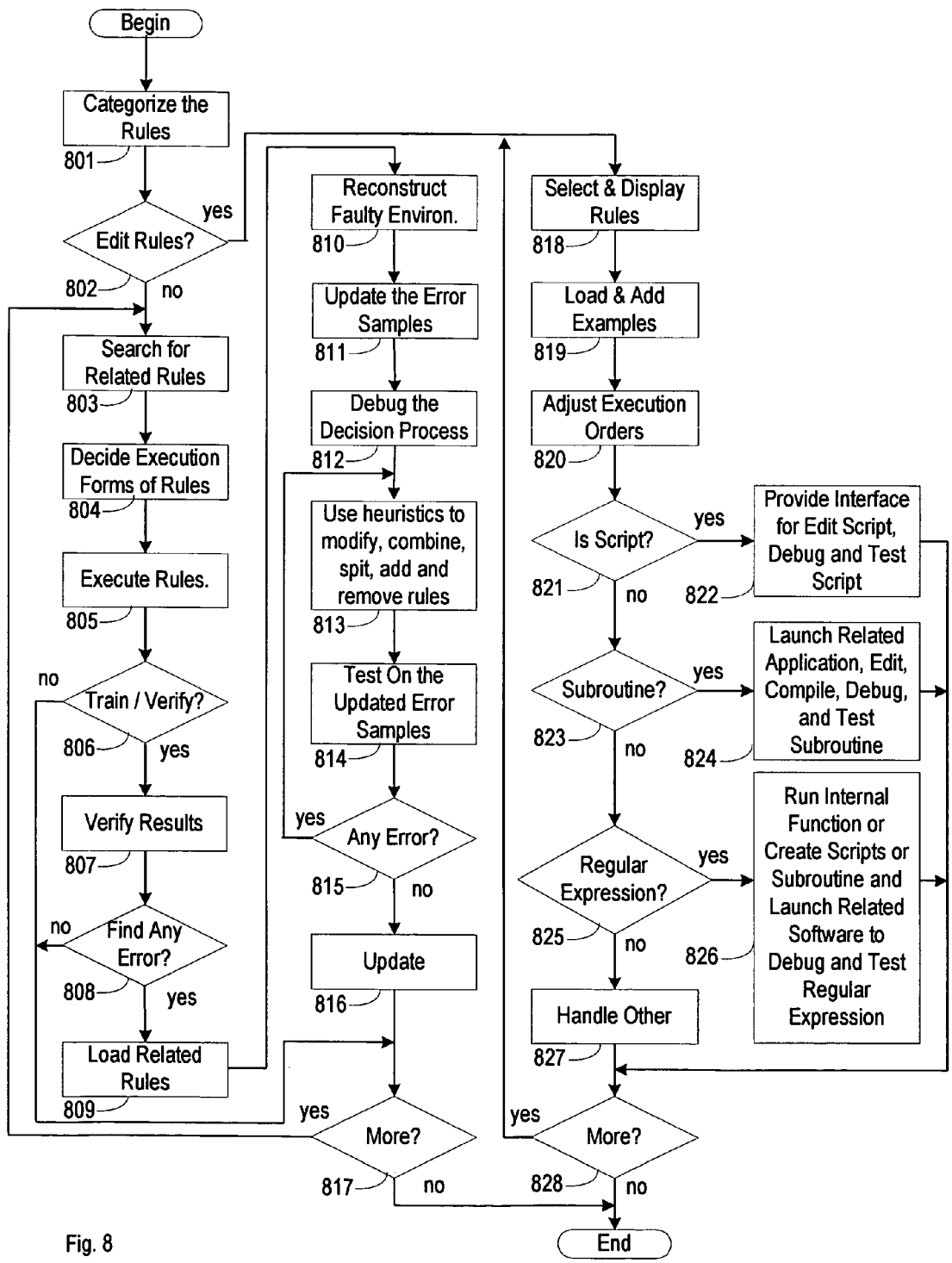
FIG. 8 illustrates a general flowchart for the modifying rules step 704 in FIG. 7.

At step 704, the system provides interfaces and utilities for a user to create, edit, train, test, and sort various rules and their associate procedures. FIG. 8 will show an exemplary flowchart of step 704.

At step 705, the system identifies the next task to be done. A rule associated with a task can have several different implementations with each one for a particular situation. Usually a rule is in a human interface friendly language or description and has one or more implementations. An implementation can be a procedure written in a particular language, a macro, a piece of formal language, and a specification of pattern match. For convenience, both a rule and its various implementations will be called a rule for short. By identifying a particular environment, the system will call a corresponding procedure or call a related application to explain, interpret, and execute the rule accordingly.

At step 706, the system checks that if the task to be performed has associated rules. If yes, go to step 707 and otherwise go to step 708.

At step 707, the system identifies the procedures associated with the rules. The procedures are the actual implementation of corresponding rules, which can be in many different forms such as regular expression and high-level computer language. If the system has not found any related procedure, then the system will generate one from a corresponding template, create one by following user's instruction and example, or provide interface for a user to perform the task.

At step 708, the system checks that if there are related templates saved in a database. The system uses these templates as examples to handle similar tasks. How the task related to a template depends on the settings and related rules for identifying the correlation. If yes, go to step 709 and otherwise go to step 711.

At step 709, the system locates templates to generate new rules and associated procedures by following rules specifically for creating new rules and procedures. These rules are called rule's rules. The templates can also embed some rules for generating new rules and procedures.

At step 710, the system provides interfaces for a user to specify, modify, and test the rules and their corresponding procedures.

If there are no associated rules and procedures associated with a particular task, and there are no templates related to the task, then at step 711, the system will check that if a user wants to train the module. If a user wants to train the module, go to step 712 and otherwise go to step 716.

At step 712, the system provides an interface for a user to set up training aspects and to select learning strategies. This can be done automatically according to setting, preference, and related rules for controlling the training aspects and learning strategies.

At step 713, the system records what a user has done while providing an interface for the user to accomplish the task.

At step 714, the system creates the rules according to the example set up by a user, setting, preference, as well as rules for training. Then, the system provides interfaces and utilities for the user to modify and test the new rules and their procedures. A very common form of the rules is in term of macros.

At step 715, the system lets the task and the corresponding rules registered. Later on, when system encounters a similar task, the system will be able to use related rules to perform the task.

Sometimes, a user may want just run a task for once. At step 716, the system will provide interfaces and utilities for a user to complete the task without adding or modify any rules and their associated procedures.

FIG. 8 shows an exemplary flowchart of the module 704 in FIG. 7 for creating, modifying, training, testing, and categorizing rules and associated procedures. Since some tasks can involve many different cases, it can be difficult to describe them at very beginning. Sometimes a task can be so complex that it is desirable to handle it on category basis or even on instance basis. One example of a complex task is grammar analysis. Even possible, it is very difficult to list all situations and then define a very complex algorithm to identify the sentence structures for every case. It will be much easier to refine algorithm gradually by making it be able to handle each new encountered problem as well as old ones. Another example of a complex task is what information to look for, how to extract information from an input document, how to format information, and how to display information. Depending on many different factors, the required processing can be very different for different situations. Due to the uncertainly, the system provides interfaces for a user to create rules in various forms such as scripts, macros, subroutines, and regular expressions and to modify them heuristically.

At step 801, the system categorizes the rules according to various partitions. A rule can be in one or more categories. A user can display the rules and their associated examples by categories.

At step 802, the system checks that if a user wants to edit rules specifically. If yes, go to step 818 and otherwise go to step 803.

At step 803, the system searches for related rules to complete a task. A task can have one rule or more rules associated with it. One can consider the multiple rules associated with a task as a single big rule, which has several sub-rules with each one for dealing with a different case. When a task associates multiple rules, the system depends on priorities, implementations, and special considerations as well as user's specifications to decide which rule for the task. Further, a rule can have several possible forms such as script, subroutine, and regular expression. If a rule is in a form such as in C, Pascal, or Basic, the system will compile the rule to generate an object code and link the object code to a DLL, or produce an executable code, or to explain the rule and call a related application to run.

At step 804, the system decides the forms and priorities for each rule associated with the task.

At step 805, the system executes the rules. The system will try to execute the rules with highest priority first. If not applicable, then the system will try to execute the rules with lower priority. The system also creates the necessary environment to run these rules in a specific order. For example, for a rule in regular expression, the system will execute it directly if the system has embedded the running environment for such expression and will execute it indirectly if not by calling a related application.

At step 806, the system checks if a user wants to verify the results or train the rules. If yes, go to step 807 and otherwise go to step 817.

At step 807, the system displays the results so that a user can verify. Depending on the task, the results can be the extracted information, the formatted text, etc.

At step 808, the system checks that if a user finds anything wrong. If there is something wrong, go to step 809 and otherwise go to step 817.

At step 809, the system loads related rules for the task. There is discrepancy between what a user expects and what these rules generated.

At step 810, the system reconstructs the faulty environment, which includes the section of document involved and the original status before executing the rules related to the task.

At step 811, the system provides an interface for a user to specify the new error sample and add it to the existing error samples. The system uses these error samples to test rules to see if they function correctly. The system also provides interfaces for a user to categorize and edit the error samples.

At step 812, the system displays the process of how the rules generate the results.

At step 813, the system provides interfaces with various features for helping a user to debug the rules. A user can modify rules, combine rules, split rules, add new rules, reorder rules, and remove unwanted rules by heuristic approach.

When people fix a problem, people could create a new problem. Therefore, at step 814, the system applies the updated set of rules to a related set of error samples and displays the results if they are different from the correct ones saved in the database.

At step 815, the system checks that if there is any error. If anything is wrong, repeat steps 813 to 815 until no any error. Otherwise, go to step 816.

At step 816, the system saves the results and updates the status. The status includes everything necessary for duplicating a verifying process from this particular point.

At step 817, the system checks that if there are any more tasks to be run. If yes, repeat steps from 803 to 817 until no more tasks. Otherwise, end.

Another branch is from step 802 to step 818 when a user wants to edit rules specifically. This branch is for a user to display related rules, modify them, adjust their orders, and test them.

At step 818, the system provides an interface for a user to select rules and display them in proper forms.

At step 819, depending on the rules selected, the system loads related examples into the memory. The system also provides interfaces for a user to create new examples.

At step 820, the system provides an interface for a user to specify the priority of each rule under the same category or for a same task.

At step 821, the system checks that if a particular rule is in the form of script. If yes, at step 822, the system will provide an interface for a user to examine, debug, and test the script. If the rule is not in form of script, go to step 823.

At step 823, the system checks that if the rule is in the form of subroutine. If yes, at step 824, the system provides interfaces for a user to edit, compile, debug, and test the subroutine directly or indirectly. If the system has already embedded a related application as part of the system, the system will provide debug interfaces for the user to debug and otherwise the system will launch the related application and create proper test bench for the user to debug. If the rule is not in the form of subroutine, go to step 825.

At step 825, the system checks that if the rule is in form of regular expression. If yes, go to step 826 and otherwise go to step 827.

At step 826, the system first decides what language used in the regular expression and then provides necessary interface for a user to debug the rule. If the system understands the language, the system will translate the regular expression into a script or a subroutine, explain or compile, run, and show results as well as possible problems. If the system has not embedded that language, the system will launch a related application to run the regular expression, to show the results, and to provide an interface for the user to debug.

The rule may be in a form other than script, subroutine, and regular expression. For example, the rule can be in a form of formal language, macro, in some kind of description, or in form of examples. At step 827, the system provides interfaces for a user to specify how to deal with the rule and calls a related application to run and debug the rule.

At step 828, the system checks that if a user wants to edit other rule. If yes, repeat steps 818 to 828 and otherwise, end.

Figure 9:
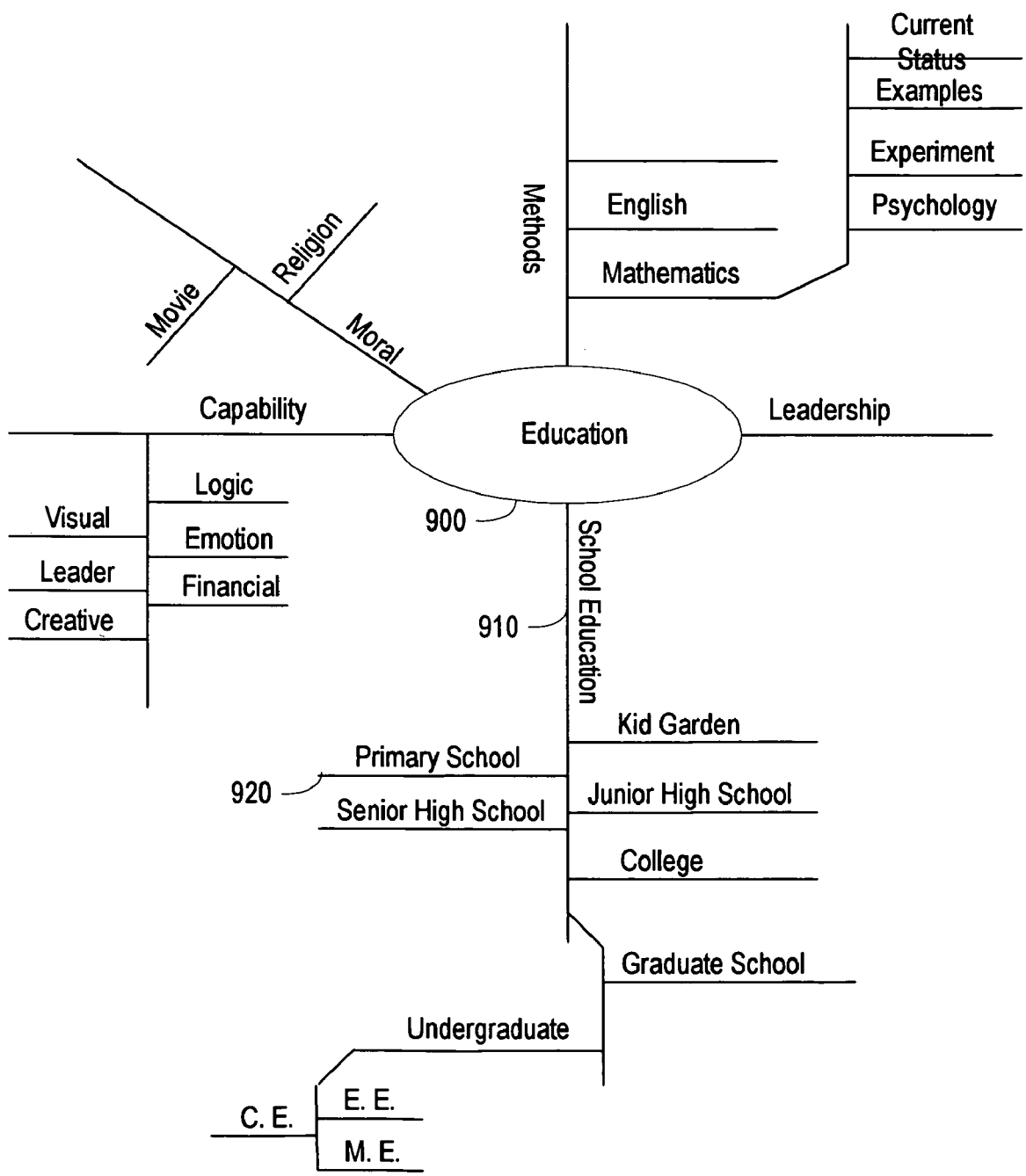
FIG. 9 illustrates an example created by the idea stimulator module 306 in FIG. 3.

FIG. 9 is a branch egg, which is an example of idea stimulator module 306. The branch egg provides various basic shapes used in brainstorm such as oval shape 900, main branch 910, and minor branch 920. The window interface for building branch egg allows a user to add, delete, move, and copy. The interface can also provide tools for a user to search for and display related items and presents the user a series of questions common to the type of document under consideration. Further, through the interface, a use can search for similar items, further general items, and further specific items. After collecting information from a user, the system will organize user's input by calling the idea organizer module 307.

Figure 10A:
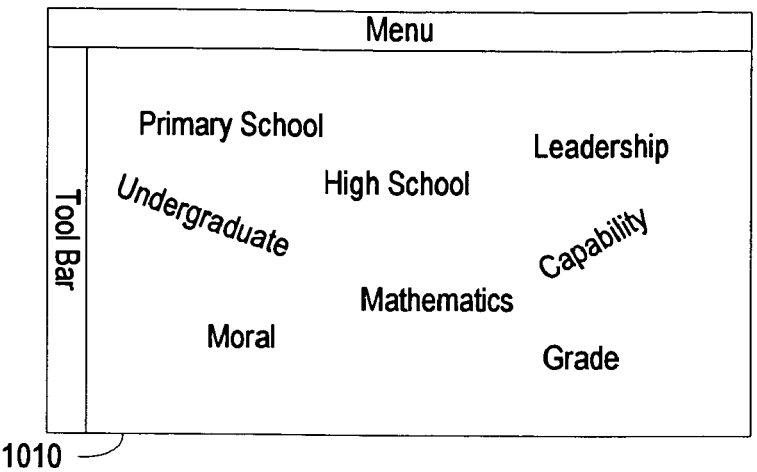
FIG. 10A illustrates another example created by the idea stimulator module 306 in FIG. 3.
Figure 10B:
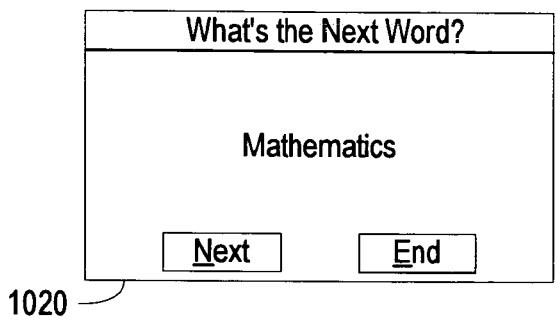
FIG. 10B illustrates another example created by the idea stimulator module 306 in FIG. 3.
Figures 10C, 10D:
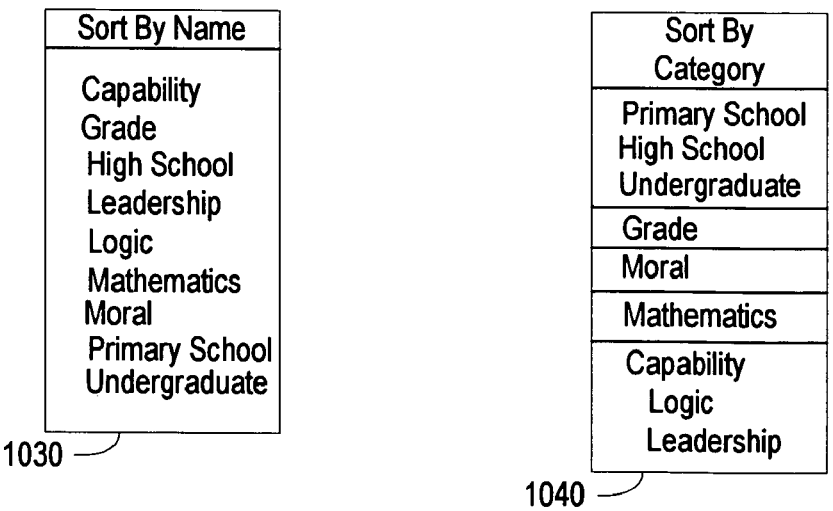
FIG. 10C illustrates an example generated by the idea organizer module 307 in FIG. 3.
FIG. 10D illustrates another example generated by the idea organizer module 307 in FIG. 3.

FIGS. 10A and 10B are examples of the interfaces for the idea stimulator module 306 and FIGS. 10C and 10D are examples of the interfaces for the idea organizer module 307. A user may prefer free writing to jot down whatever in his or her mind on an interface shown by 1010. The system displays the input in color and proper position. The slopes of displayed text can be some kind of random values in certain ranges. If a user wants to generate a series of words but does not want to be bothered by what generated already, the user can select an interface indicated by 1020. Through the interface, a user can type whatever in mind and press the enter key or next button, the system will record the word or phrase just typed and make the interface ready for next input. Then the user can enter the next word or phase. After the user finishes, the user can organize the words or phrase by many different ways such as sorting by name as shown in 1030 in FIG. 10C and sorting by category as shown by 1040 in FIG. 10D.

The system can provide interfaces for a user to specify the rules on how to transfer a diagram to a different diagram for idea stimulating module 306 and on how to organize ideas for the idea organizer module 307.

Figure 11:
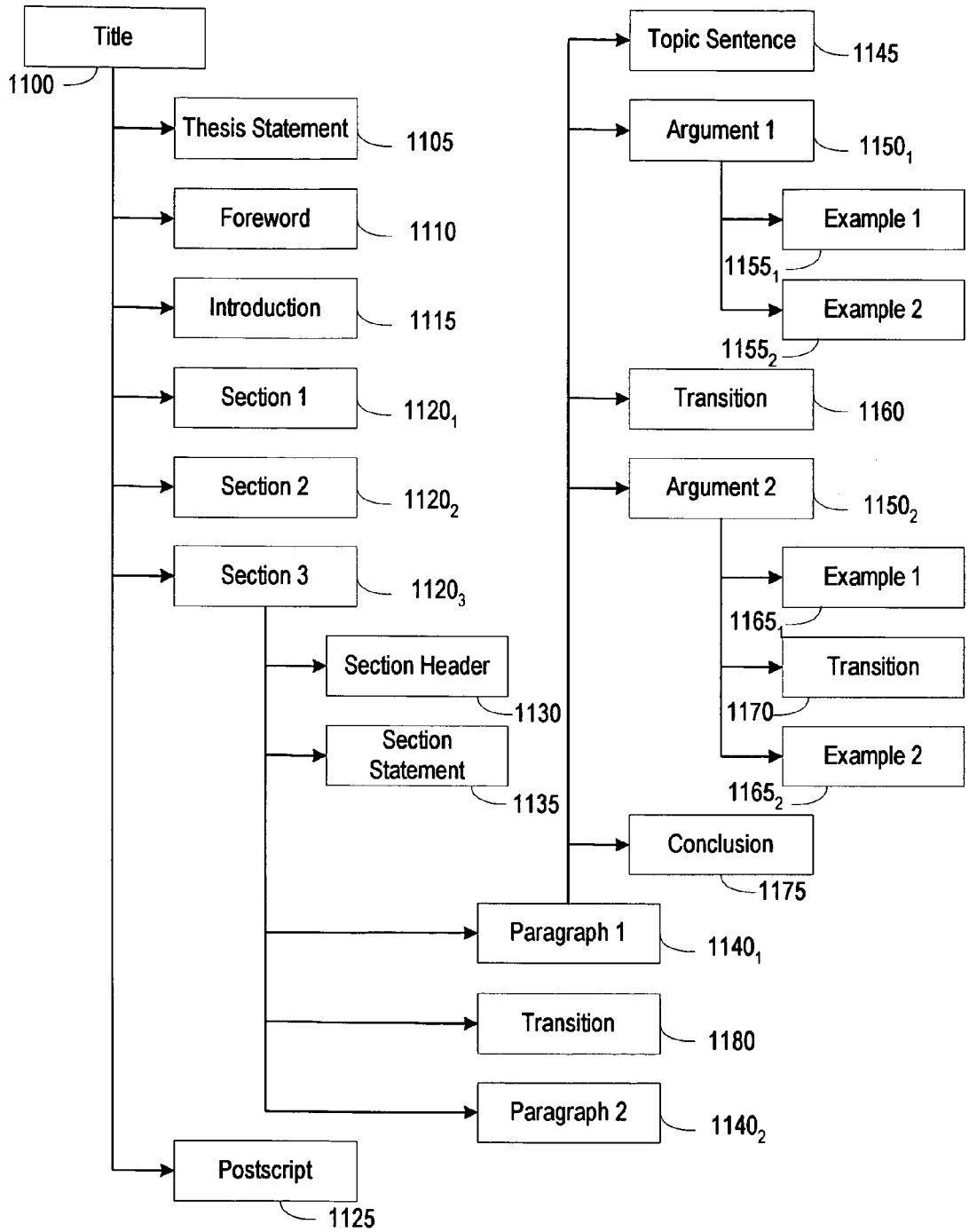
FIG. 11 illustrates an example of a structure.

FIG. 11 is an example of a structure. There can be many different structures with each one for a particular purpose. Since the one shown in FIG. 11 contains most components of a regular document, it is one of the most commonly used structures. This structure has the most frequently encountered components such as title 1100, thesis statement 1105, foreword 1110, introduction 1115, sections $1120_1$ to $1120_3$, and postscript 1125. Under each section, there are section header 1130, section statement 1135, and paragraphs $1140_1$ to $1140_2$. Each paragraph further comprises topic sentence 1145, arguments $1150_1$ to $1150_2$, and conclusion 1175. Each argument may comprise of one or more examples. For instance, the first argument $1150_1$ has examples $1155_1$ to $1155_2$ and the second argument $1150_2$ has examples $1165_1$ to $1165_2$. There can be a transition word or phase 1180 between two paragraphs, a transition word or phase 1160 between two arguments, and a transition word or phase 1170 between two examples. Each of these components is a tag or corresponds to a combination of several tags. A user can expand some of these components to explore more detail information or collapse to have an overall understanding. The system provides interfaces for a user to add, copy, delete, hide, expand, or compress a component. A user can create a new structure from the one shown in FIG. 11 by adding more components, removing some components, or using both. The system can also provide an interface for a user to assign properties to these components. For example, a user can specify the example $1155_1$ as the default example for illustrating the first argument $1150_1$.

There can be several ways to display a same structure with each way to emphasize different aspect of the document. Depending on setting, the system can display all information about a component simultaneously or display the default information of the component only and display other information when required by a user.

Figure 12:
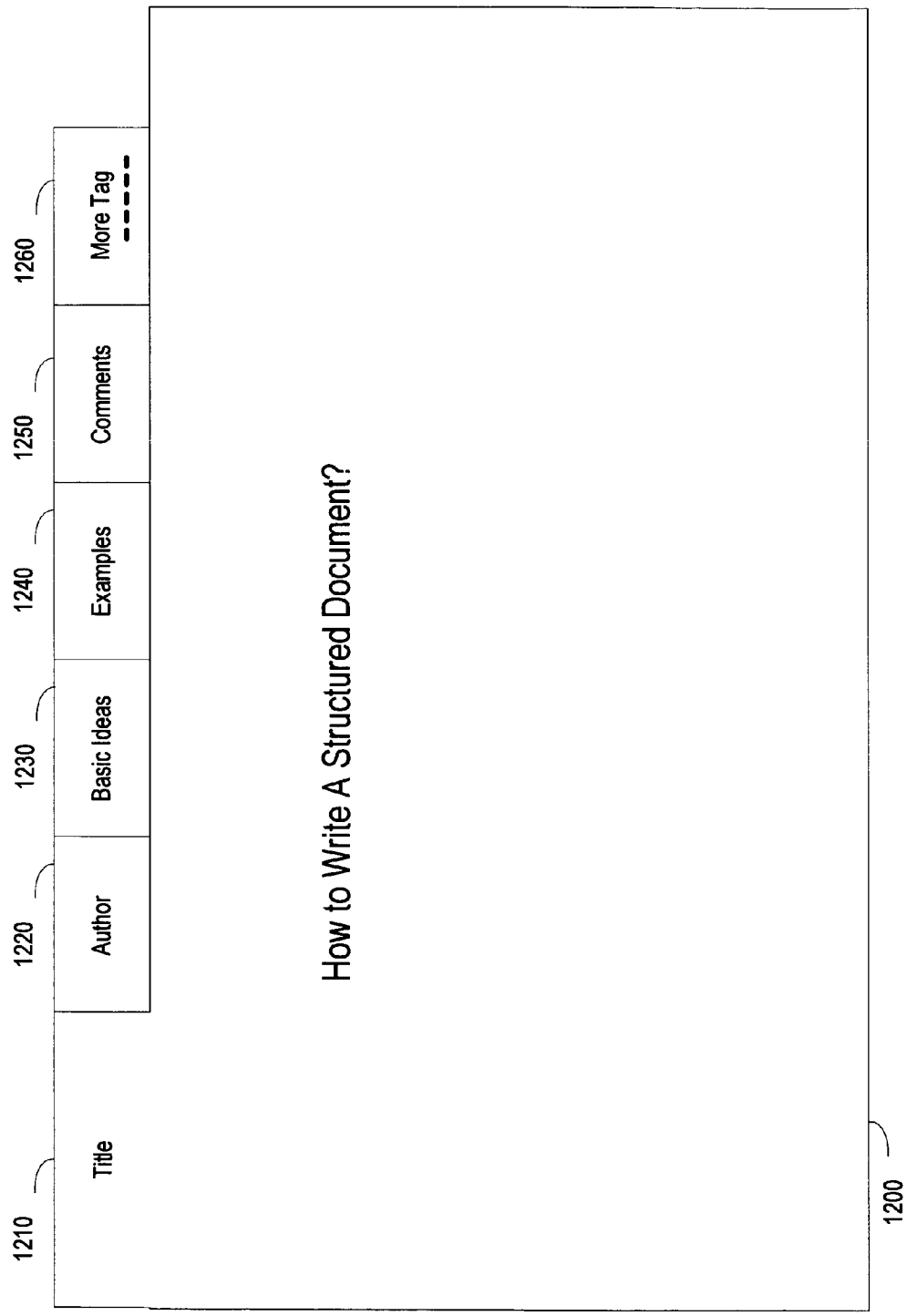
FIG. 12 illustrates a virtual card as an exemplary interface for the information collector module 305 in FIG. 3.

FIG. 12 shows a virtual card 1200, which is an example of the possible interfaces of the information collector module 305. The information collector module 305 can have various forms but their basic function is the same. That is, to provide graphic interfaces to help a user to collect information from paper, book, Internet, and other resources. The database management module 316 sorts and saves the collected information in a database and provides interfaces for a user to search and display related information. The virtual card 1200 shown in FIG. 12 serves as the front end of a database by providing a user-friendly interface to collect information. The virtual card can have tags such as title 1210, author 1220, basic ideas 1230, examples 1240, comment 1250, and more tag label 1260. Whenever a user select a particular tag, the system will provide corresponding tool bar, menu, or icons for helping the user to collect information. The system can also provide interfaces for a user to copy data from a tag to another tag and to link a tag to another tag on a same virtual card or on a different virtual card.

FIG. 13 shows the diagram of identifying the type of an input document. A user may want to use different approaches to handle different documents for effectiveness and efficiency. For some document types, there can be some predefined structure templates for handling each of these document types specifically. The system loads both the information 1300 from a database and Internet and the information 1305 extracted from the input document into the source identification subsystem 1310, the author and title identification subsystem 1315, the topic identification subsystem 1320, the 4WH identification (who, when, where, which, and how) subsystem 1325, and the content or vocabulary identification subsystem 1330. Usually the source of the input document can give some hints about what the input document is. A paper from IEEE Transactions on Communications most likely will talk one of communication related technologies. The author of the input document as well as the title of input document can give some information about the possible issue of the input document. A person published some papers on mathematic have a big chance to publish another one. By making use of the information saved in the database, the system can assign each of document types a corresponding possibility according to author's name and the keywords in the document title. The professional title as well as author's affiliation can be also helpful. It has much higher possibility for a professor of an electrical engineering department talks about something related to electrical engineering than to chemical engineering. A document contains keys words and may contain an abstract as well. By saving and categorizing most commonly used keywords into database, the system can know the possibility for a document to be a particular document type by extracting information from abstracts and key words. The system can extract more information according to the rules for providing questions with who, when, which, where, and how and analyzing the answers from these questions. The system can generate a preliminary decision for the input document to be a particular document type by examining the vocabulary used in the input document and compares the vocabulary with the ones for the particular document type. By comparing information, each subsystem makes a decision with a probability for the input document to be a particular document type. Then, the system makes a joint decision in the subsystem 1335 according to the preliminary decisions from each of the subsystems and the predefined rules for making a joint decision.

A user can override the decision on the document type of a document. At step 1340, the system checks that if a user wants to specify the document type by himself or herself. If yes, at step 1345, the system will provide an interface for a user to specify the document type and overwrite the decision of the joint detection subsystem 1235. Otherwise, keep the decision from the joint detection subsystem 1335.

FIG. 14 shows a general flowchart of the structure analysis 311 in FIG. 3. In the flowchart, the system identifies the sentence structures of the input document first and then extracts other information from the input document. A major portion of the structure analysis is grammar analysis. With correctly identifying speech parts and sentence structures of a sentence, the system can separate the sentence into several parts at proper positions. Instead of extracting other information directly from a sentence, the system can extract other information from a part of the sentence. Since each part is smaller than the sentence and usually a part is relatively independent from other parts, it would be easier for the system to extract information.

Now assume the document is in flat mode, that is, in electrical form but not organized yet. If it is not in electrical form, it will go through preprocess to convert it into an electrical form. If it is a structured document, the system will extract all the information from the input document and reconstruct original structures contained in the structured document.

At step 1401, the system loads related external information. For example, if the input document is a paper copied from a journal, the system will search for journal name, load the paper format or template required by that journal and the terminology most frequently used by that journal into memory.

At step 1402, the system identifies all the punctuation marks. These punctuation marks separate one sentence from another one and sometimes convey extra information. For example, the period mark "." usually is used to identify the end of a sentence but in "Mr." and "Ms.", it does not mark the end of a sentence instead it means an abbreviation Also the question mark "?" is usually at the end of a question sentence but in the sentence such as "The author was born in 1910(?) and become famous around 1940." The question "?" together with the parentheses means that the exact year is not sure or in doubt. A person can define a punctuation mark rule for each punctuation mark. According to a punctuation mark identifying rule, the system will identify the corresponding punctuation mark as well as its functions.

At step 1403, the system identifies various idioms and phrases, which have fixed forms in text. These idioms and phrases include verb phrases, prepositional phrases, and other fixed usages. According to the idioms and phrases saved in database as well as related rules, the system will identify them, save computer time, and provide basis for further analysis.

At step 1404, the system identifies all special words. These special words can be conjunction words that play an important rule to separate clauses, question words "who, which, where" that can introduce a question clause, and articles "a, an, the" that usually followed by a noun structure when they are used as an indefinite or definite adjective. These special words help the system to determine the likelihood of each of possible speech parts and each of possible sentence structures. For example, after the article "a", there should be a noun or a noun structure.

At step 1405, the system assigns a possibility for a word to be to a particular speech part for all speech parts. Some words have only one speech part and many words have two or more speech parts. For example, the word "derive" has only one speech part "verb" but the word "wait" can be a verb or a noun. However, even for a word having several speech parts, under a particular circumstance, only one of them is valid.

At step 1406, the system extracts further information from the input document. At the beginning, the system may have no enough knowledge to make a decision, as the system has collected more and more information, the system will know what information it will look for to verify a judgment or to deny a judgment according to related rules for further extracting information.

At step 1407, the system identifies the title of the document. In most cases, the title of a journal paper has one or several relatively fixed positions. The title usually is a short sentence with all of its words capitalized, with the first letter of each word capitalized, or with different fonts from the other text.

At step 1408, the system identifies the author. The author's name usually appears under the title at one or several relatively fixed positions for a typical paper in a particular journal. The system can save first names and last names from people from different countries and well-known people's names into its database. After locating the words on the place that a name supposed to appear, the system will compare the words with the names in database and identify a particular person. If the words are not included in the database, the system will check if they are in a dictionary. If not, there is a good opportunity that the words are some one's name.

At step 1409, the system identifies all the subtitles in the document. The subtitle can be the headline of each section or chapter. These jobs can be done since a subtitle usually is in a relatively fixed position with standalone lines, with different font, and with wider space before it and wider space after it.

At step 1410, the system identifies the sections of the input document. Each section can be a chapter with title, or numbers, or both. A section can be the several highly interconnected paragraphs with relative more white space between sections than the white space between the paragraphs inside a same section. Sometimes a section is separated from another section by a line consisting of some special symbols.

At step 1411, the system identifies the paragraphs. The system separates one paragraph from its very next paragraph by checking a cartage return, more than necessary spaces at end of a line, more line space between two lines, dent on the next line, and different font on the first character of the first word of the next line.

At step 1412, the system identifies sentence. A sentence can be distinguished from the next sentence by checking marks such as "?", ".", and "!". Usually these marks do indicate a sentence but not every time. For example, the period marks "." in Mr., Mrs., Ms., and U.S.A. do not indicate a sentence. However, the system can handle these exceptions by training and saving related abbreviations in database.

At step 1413, the system checks that if there is any more section. If there is any more section, go to step 1414 and otherwise, go to step 1423.

At step 1414, the system obtains the next section.

At step 1415, the system checks that if there are any more paragraphs in the current section. If no, go to step 1416 to identify the relation among the paragraphs in the same section and otherwise go to step 1417. The relations between paragraphs are defined by relation rules. Some examples of relations between paragraphs are "continuation", "simultaneous event", "comparison", "specialization", "generalization", and "example". The system can provide interfaces for a user to define a relation and the rules for identifying the relation.

At step 1417, the system loads next paragraph for processing.

At step 1418, the system checks that if there are any more sentences under current paragraph. If yes, go to step 1419 and otherwise, go to step 1421.

At step 1419, the system loads the next sentence for processing.

At step 1420, the system analyzes the sentence. The analysis can be done according to the information extracted before, pattern match, and possibility estimation. The system tries to figure out the sentence structures such as subject, predicate (verb and object), adverb modifier, noun modifier, as well as speech parts such as noun, pronoun, and adjective.

At step 1421, the system analyzes the relation among the sentences of a same paragraph. The analysis can be done according to the information extracted before, patterns, and related rules. The system tries to figure out which sentence is argument, which one or which several ones are examples, which one is the conclusion, and which one is the topic sentence. The system also tries to figure out the paragraph pattern such as logical order, from simple to complex, etc. Further, the system can provide interfaces for a user to define a relation among sentences and the rules for identifying the relation.

At step 1422, the system generates the topic sentence by either finding the topic sentence from the input document or creating the topic sentence according to the arguments in the paragraph as well as related rules for building a topic sentence. The system can assign a proper property to indicate if a topic sentence is the original sentence in the input document or if the topic sentence is created from a topic generation rule. A user can define a topic generation rule by specifying topic sentences model. The system can also link various properties to each sentence to describe what the sentence is about, find the common properties associated to every sentence in a paragraph, and then generate a topic sentence according to these common properties. Further, the system can provide an interface for a user to define the rules to identify topic sentence and to create a topic sentence as well as to specify topic sentence manually.

At step 1423, the system identifies the relation among different sections. If each section has a text subtitle, the system can establish a relation according to these subtitles. If section has no subtitle, or has a title containing just "1", "2", "3", then the system will organize information according to some basic development techniques such as "chronological order", "cause and effect", and "spatial order". The system also provides an interface for a user to define section relation rules as well as to specify a particular relation among sections manually.

At step 1424, the system provides interfaces for a user to assign special properties to related text portions. The system can also assign a special property to a related text portion automatically by following the rules for identifying an interesting portion. The system will use these properties to extract special information. Further, the system provides an interface for a user to create and modify a rule for identifying an interesting portion of text and to specify a portion of text manually.

At step 1425, the system extracts other information from corresponding portions of text with special properties. The system also can provide interfaces for a user to exact interesting portions text manually.

At step 1426, the system links tags to related blocks of document and fills tags with related information. The system creates tags according to structure templates, user's setup, and default requirements. The system also provides an interface for a user to define a tag and link it to corresponding information.

FIG. 15 is an exemplary display form 1500 for presenting information from a corresponding structure. Focusing on transferring information, the display form provides a user to look at the information at a same tag simultaneously as well as jump to a different tag. The display form shows the title tag 1510, the thesis statement tag 1520, the ideas tag 1530, the examples tag 1540, the figures tag 1550, and more tags 1560. When a user clicks the ideas tag 1650, the system will display all the basic ideas in the input document in a proper order and with proper format. Usually a display form has each of its tags corresponded to a tag in a respective structure or several structures. Sometimes a display form can have more or less tags than its corresponding structure by hiding some tags or building some new temporary tags. A tag on a display form can be an original tag in a structure or created from one or more original tags on the structure by adding, copying, deleting, and hiding a tag, combining some tags, or splitting some tags. A display form can also include some temporary tags for showing some particular information extracted from the input document, database, and Internet, combining some tags, or splitting some tags.

FIG. 16 shows another exemplary display form 1600. A user can have various interesting points. For example, the most common points may include title 1610, basic ideas 1620, FIGS. 1630, tables 1640, examples 1650, and user comments 1660. These tags can contain exact text from the original document, or a modified text, or generated text. The system can provide an interface for a user to dig into the process of how a particular derived item is created by showing original information and related rules for related processing. Further, each tag can contain information belong to a property or a tag, or the combination of several properties or tags. A user can also jump from a place to a different place by establishing links among different tags as well as texts. For example, when a user reads a topic sentence, the user may want to see the related examples. Through a proper window interface, a user can either jumps to the related example or sees the related example on a second window. The display form can also provide an interface for a user to find particular information as such a particular text, a terminology, or a particular sentence in the display form.

Figure 17:
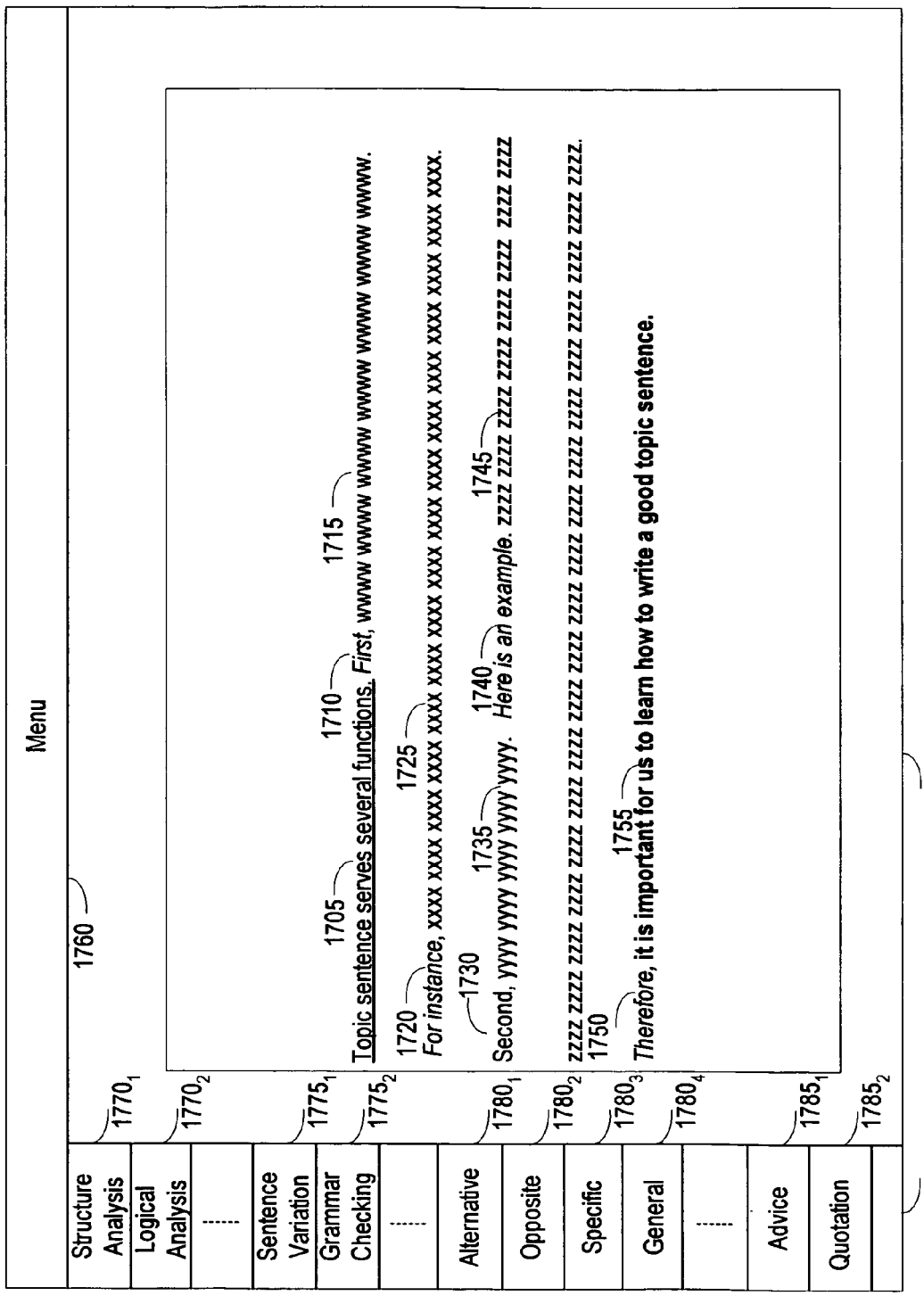
FIG. 17 illustrates another exemplary display form created by the structure display module 313 in FIG. 3.

FIG. 17 shows an exemplary interface of the structure developer module 309 in FIG. 3. Because there are many ways for a user to develop a document, there are many ways to implement structure developer 309 in FIG. 3. The variations are due to different window interface and different emphasis on components of a document. For example, when a user is ready to work on the second paragraph 1140$_2$ in FIG.

11, the system can let a user proceed in two ways. One way is to provide corresponding interfaces for a user to fill details systematically by supplying topic sentence, argument, and example associated with the paragraph. Another way is to provide interfaces for a user to write a paragraph by supplying a blank text client area so that the user can fill all information. After writing the paragraph, the user can assign properties to each portion of text for marking its function. For example, a user can mark the topic sentence 1705, the transitional words or phrases 1710, 1720, 1740, and 1750, arguments 1715 and 1735, examples 1725 and 1745, and conclusion 1755. The menu 1760 provides a user various actions commonly used for developing a particular type of document, paragraph, etc.

The interface for developing structure can have tool bar 1765 with various icons for convenience. Depending on the document components under current working, the system can show, hide, active and disable some icons. When a user clicks the structure analysis icon $1770_1$, the system will perform structure analysis on the document if no structure analysis has been performed or the document has been updated. The tool bars can have many useful icons attached. For example, there can be a logical analysis icon $1770_2$ for determining the developing strategy used in a paragraph. A developing strategy can be chronological order, generalizations and specifics, classification, comparison and contrast, cause and effect, problem and solution, comparison, or contrast. When a user clicks sentence variation icon $1775_1$, the system will display a different form of a selected sentence or sentences so that the user can chose one to replace the original one. A user can also check spelling and grammar by clicking the grammar-checking icon $1775_2$.

When a word or a phase has been selected, if a user clicks the alternative icon $1780_1$, the system will display its synonymous words will some explanation on the usage of each one. If a user click the opposite icon $1780_2$, the system will display its opposite words. If a user clicks the specific icon $1780_3$, the system will display the words with further specific meanings if a user clicks the general icon $1780_4$, the system will display the words with further general meanings.

There can be other icons on the tool bar 1765. When a user clicks the advice icon $1785_1$, the system will display a related advice and provide corresponding examples. The system can display a window interface, let a user specify an issue and define a scope, then search for the related advice and examples. The system can also provide helps according to what the user is working on, in which particular module, etc. When a user clicks the quotation icon $1785_2$, the system will provide interface for a user to specify whose quotation and what kind quotation the user is looking for, then the system will find the related quotations from database or Internet and display them. The system further provides an interface for a user to specify that if the user wants to include any quotations, which portion of a quotation should be included, and where the quotation should be inserted.

A user may want to access information by a way similar to regular reading. FIG. 18 shows the flowchart to display information sequentially. After a user has generated structures from an input document or created structures from scratch, the system provides an interface for a user to specify how to display information sequentially. First, the system provides interfaces for a user to specify how to display information from each individual tag or specify how to combine information from several tags from one or more structures. Then the system provides interfaces for a user to associate images with certain objects, insert images into the presentation, specify voice feature, generate dialogue-script, and create sounds. Further, the system provides interfaces for a user to format the information, to specify the order and speed to display information, and to search for related information. The example is done under the control of a user. It can also be done by the system automatically by following a rule to conduct such a procedure.

At step 1801, the system displays all the available structures in each category for current document.

At step 1802, the system provides an interface for a user to select structures.

At step 1803, the system provides an interface for a user to select tags from the selected structures.

At step 1804, the system provides an interface for a user to combine the contents in several different tags together or use only portion of the content of a particular tag.

At step 1805, the system provides an interface for a user to specify the format of the combined information. There can be one or more fonts for the combined information. The fonts determine how the system will display this information.

At step 1806, the system provides an interface for a user to specify the display order of the combined content and display speed. The display order determines at what sequence the system will display this particular information and the display speed determines how long this particular information will display. When presenting information, the system can further provide various interfaces for a user to move forward quickly, move backward quickly, pause for a while, and search for interesting information.

A user may want to insert some image for emphasis and decoration. At step 1807, the system checks that if a user wants to insert some image such as background wallpaper. If no, go to step 1809 and otherwise go to step 1808.

At step 1808, the system provides an interface for a user to specify associated images. The image can be a static one or a dynamic one. The static image will not change during the whole presentation such as the decoration frame. The dynamic image, on other hand, changes from time to time according to the text information displayed. The system provides interface for a user to create, search, and link images to some characters or particular events in a document and to create and modify the rules for character identification and event identification. On displaying text information, the system will generate dynamic image by presenting the related image on a predetermined area of a display form or panel.

A user may want the system speaks to the user while reading the displayed information. At step 1809, the system checks that if a user wants to generate sound. If no, go to step 1812 and otherwise go to step 1810.

At step 1810, the system provides interface for a user to specify the voice features for the each person involved as well as for the commentator. The voice feature includes the tone, the volume, and the pace for different modes such as regular mode, sad mode, and happy mode.

At step 1811, the system provides an interface for a user to specify related rules for creating conversation, extracts information, converts a written statement to a verbal sentence, and generates a dialogue-script for conversations and comments.

A user may want insert some sound not specified in original document into presentation. At step 1812, the system checks that if a user wants to attach sound with the presentation. If no, go to step 1814 and otherwise go to step 1813.

At step 1813, the system provides an interface for a user to insert additional sound. The sound is specified by a sound file with a proper format.

At step 1814, the system provides an interface for a user to specify the order of generated sounds. Usually the order is the same as the one in original document. There could be some difference. For example, if the original document describes in an anti-chronological order while the user has specified to display information chronologically. A user can control the speaking order directly or indirectly. The system can also provide an interface for a user to define a set of rules to identify and specify the speaking order or to specify directly the speaking order of related persons.

At step 1815, the system associates image, sound, and text together. A user can define a set of rules on how image, sound, and text should work together. Usually the sound and image will associate with the corresponding text under presentation. The system can provide an interface for a user to modify the default association indirectly or directly by modifying the rules and modifying the association respectively.

A user may want to look for other tags available in selected structures. At step 1816, the system checks that if a user wants to display information of other tags available in selected structures. If no, go to step 1817 and otherwise, go to step 1803 and repeat steps 1803 to 1816.

At step 1817, the system checks that if a user wants to select different set of structures. If no, go to step 1818 and otherwise, go to step 1802.and repeat steps 1802 to 1817.

Up to this step, the system creates the presentation information from the tags of selected structures. A user may want change the information extracted from various tags automatically and format the information in certain ways. At step 1818, the system provides an interface for a user to modify the contents to be displayed and to format the contents.

At step 1819, the system provides interfaces for a user to modify the sound file associated with the presentation. A user can specify, examine, and modify how the system will produce sound, the associated dialogue script, as well as various aspects related to voice generation.

At step 1820, the system updates the sound file associated with the presentation. The sound file includes the dialogue script or its link, and the specification of how the system will generate the sound for each sentence of the playscript. The presentation file, images, and sound file can be combined into one file in implementation with necessary marks inserted to distinguish text, sound, and image.

At step 1821, the system displays information sequentially with or without accompanied image and sound.

For a well-written document, the subject, the verb, the object, and the negative word carry major information. The system can show these major sentence structures in a longer time and by different fonts than it does on other sentence structures for helping a user to have an efficient reading. FIG. 19 shows the interface 1900 for a user to set up the format to display a document and emphasize important aspects so that a user can access information effectively in a way similar to reading regular document. The document can be an original one or a modified one. In the text display-setting panel 1975, a user can decide if the user wants display a word group, or sentence, or a paragraph each time by clicking a proper radio button in the display by group 1905. Further, a user can decide that if the display text will be updated automatically or manually by click a corresponding radio button in the update by group 1910. When a user clicks the internal timer, then the system will display the "time in seconds" field 1915 so that the user can specify the last time interval before updating a text.

A user can specify what the user wants a subject, a verb, an object, a verb modifier, a noun modifier and a special or important word to look like. A user can control the display effect for each of the sentence structures available in the combo-box 1920 by specifying display order or display sequence 1925, font family box 1930, font color 1935, font size 1940, font underline 1945, font bold 1950, font italic 1955, and font flash 1960.

The display order 1925 decides which sentence structure will display first and which sentence structure will display later. Usually a sentence or a paragraph will be displayed all at once but a user can specify if the user wants subject, verb, object, and important words such as "no", "not" to display first, then add other components. The font flash 1960 specifies if the corresponding component will flush. For example, a user can specify to flush a verb twice before the system updates the text.

The Cancel button 1960 enables a user to cancel a setting and the OK button 1970 enables a user to update the setting.

There can more tabs such as the presentation setting up 1980, which specifies if original document will be used or a modified document will be used. If a modified document will be used, to which level a user wants to project a structure into a flat document. The paragraph setting up 1985 is used to set up the alignment, indent, and line space.

The system can provide more features for a user to specify more complex display schemes. For example, the system can include an interface for a user to specify if the user wants to start a new line for each sentence or just keep the same relation among original sentences. The system can also provide an interface for a user to specify if the user wants subject, verb, and object starting on a new line for further emphasis. The system can further provide an interface for a user to specify background for a sequential presentation.

FIG. 20 shows an example of displayed text. In this example, the subject "Teacher Liang" 2000 has a font 14 of Arial family, the verb "show" 2005 has in font 14 of Arial family with underline and return, the direct object "you" 2010 has a font 14 of Arial family with italic characters. The rest will use basic font 12 of Arial family.

The window interface has menu 2015 and tool box 2020 for performing specific function. These specific functions include the searching for a specific word, finding a meaning of word, finding related words, and producing sound when display. The system can further include other functions such as setting up reading purpose, leading reader to browse the original document or a structure, generating a set of question to stimulate reader, asking reader to select a right approach to read the document, and doing post-reading test. The system can also consist of comparing reader's post-reading answer with pre-reading guess to give a user deeper impression and enhance user's memory capability. Depend on reader's requirement, the system can have other tools such as thesaurus study, sentence modification, structure modification, brief generation, etc.

There are some buttons for a user can perform certain function quickly. The commonly used buttons include the play button 2025, the repeat button 2030, the pause button 2035, the forward button 2040, the backward button 2045, the slower button 2050, and the faster button 2055. When a user clicks repeat button 2030, the last word group, the last sentence, the very last paragraph will be displayed again, depending on setting.

Figure 21:
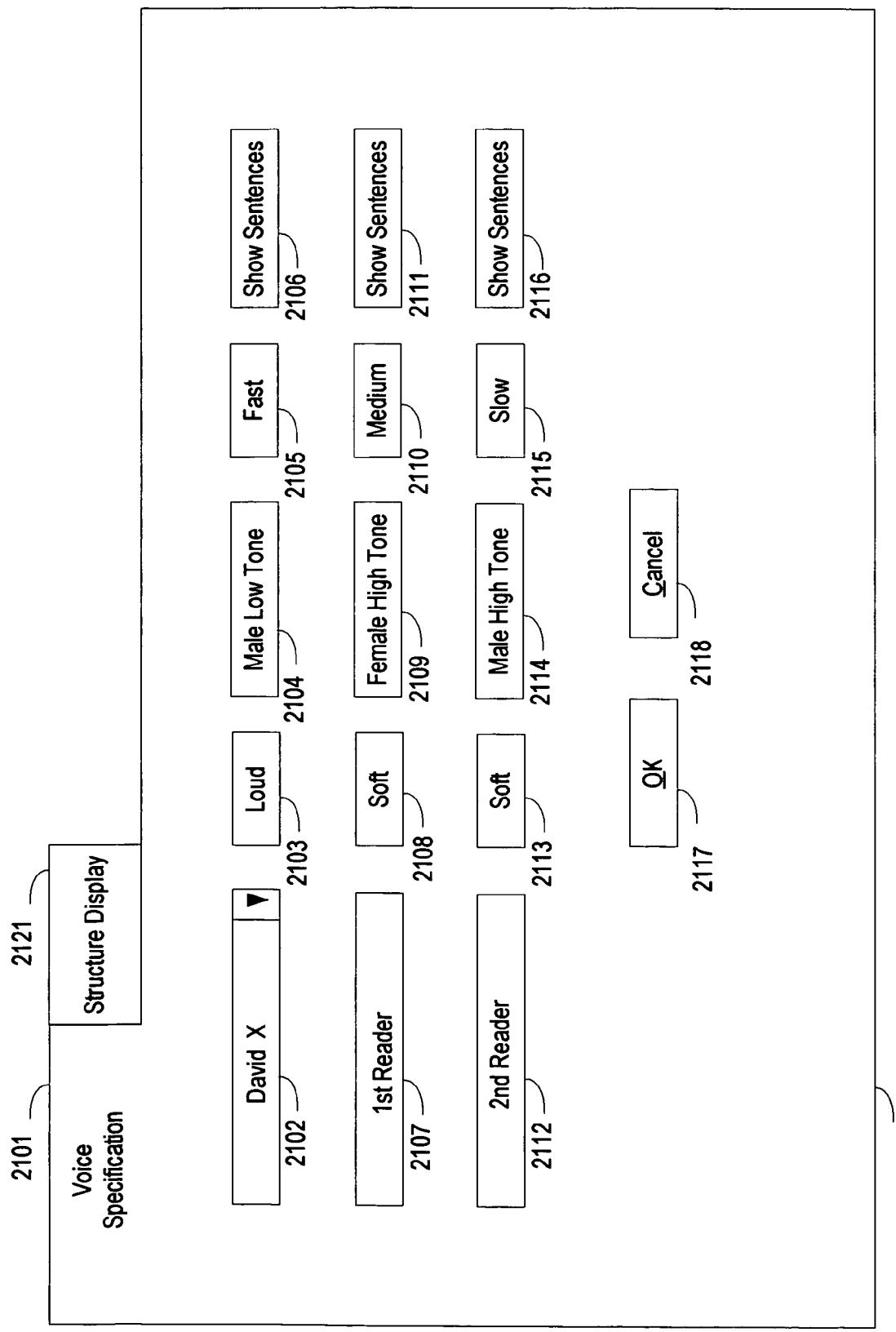
FIG. 21 illustrates an exemplary form for a reader to specify general voice features for the persons involved in an input document.

FIG. 21 shows an exemplary interface 2100 for setting up voice. In the voice specification panel 2101, a user can select an object from the combo-box 2102, specify the volume in box 2103, the frequency in box 2104. Here the object usually is a person who has some conversation in the document or an audio instrument described in the document such as a speaker. A user can also set up the general speaking speed 2105. When a user clicks the show sentences button 2106, the system will display all the sentences said by the object. The system will indicate how each sentence will be spoken, actually generate sound for each sentence, and provide interface for a user to modify the way of each sentence will be generated.

There can be one or more readers for the document. For example, a user can set a female reader and a male reader to read paragraphs by turn. A user can also let the first reader 2107 to read all background information while let the second reader 2112 to read the comment. Again, a user can specify the voice features for the first reader such as the volume through the box 2108, the tone through the box 2109, the pace through the box 2110, as well as the all sentences spoken by the first reader with clicking button 2111. A user can also specify the second reader by setting the volume box 2113, frequency box 2114, speaking speed 2115, and display related sentence by clicking button 2116. The ok button 2117 is to update the setting and the cancel button 2118 is to cancel the setting. Instead of using words, the system can provide an interface for a user to specify the volume and frequency by numbers to have controls that are more precise. The system can have other panels such as structure display panel 2121 for a user to examine how structure information will be displayed.

The system can also provide interfaces for a user to specify the voice features of each speaker, save each speaker's voice features, and link a speaker to a speaker model saved in a database.

Figure 22:
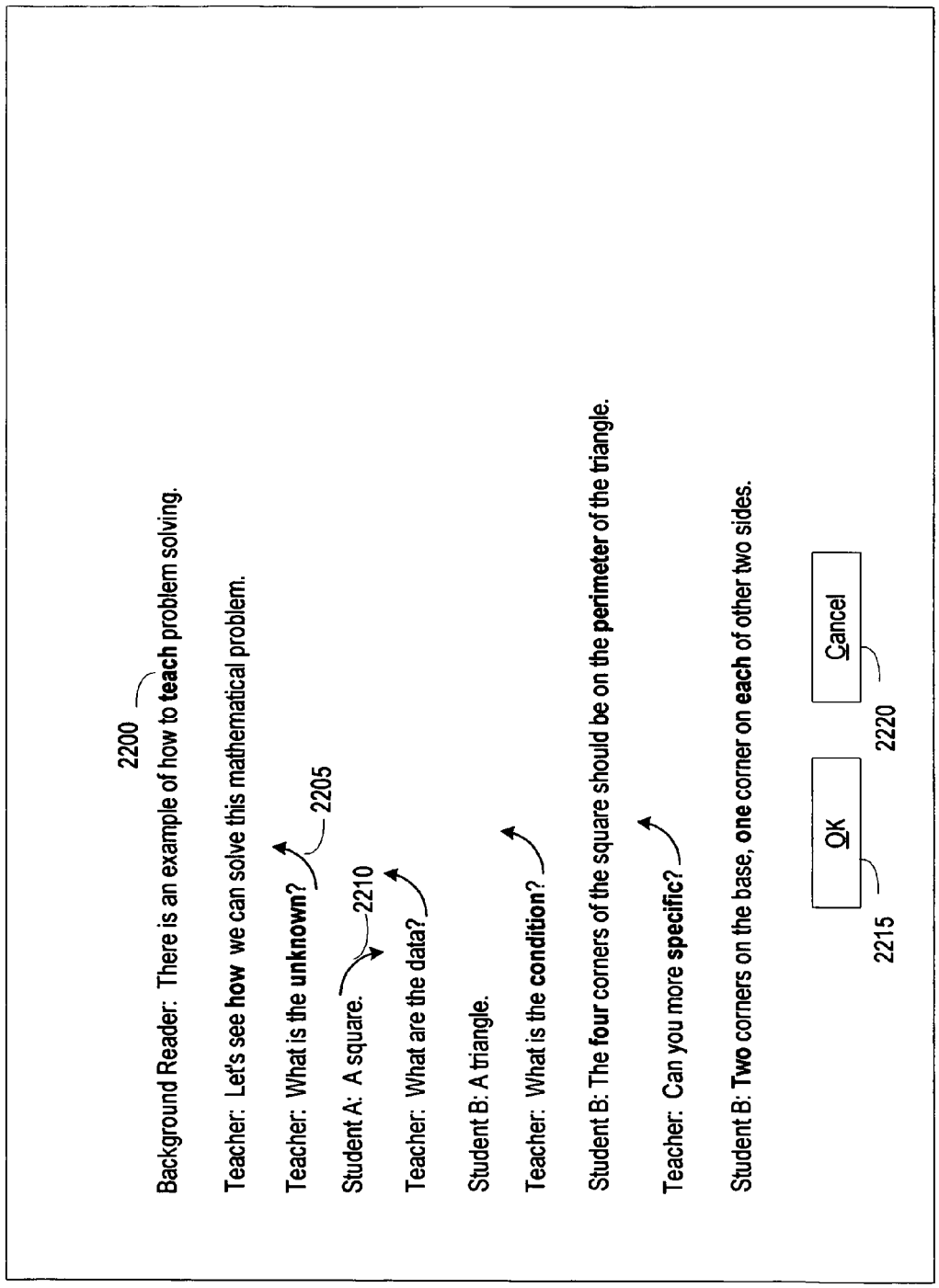
FIG. 22 illustrates an example of displaying and specifying pronunciation features of particular sentences.

FIG. 22 shows an example of displaying sound as well as the tone. The system can use more complex interface for a user to examine and specify complex speech patterns. A user can specify the stress words 2200, the raising up tone 2205, and the going down tone 2210. The system can determine the tones from sentence voice patterns or provide an interface for a user to specify. The system further provides an interface for a user to select words and specify its volume, tone, and other special features. The information for volume, tone, and pace can be in numbers for easy comparison. The system will save user's modification if a user clicks the ok button 2215 or discard any change if a user clicks the cancel button 2220.

CONCLUSION

The system disclosed in the invention helps a user to write more effectively and to read more efficiently. The system can have many potential applications. For a particular application, an ordinary person skilled in the art can add more features specific to the application to make it more attractive, powerful, and effective. One of these applications is to serve as the basis of a virtual secretary. The virtual secretary can be built on the sequential display flowchart shown in FIG. 18 with some modifications. One example of the possible modifications is to let a set of predefined rules, preferences, and setups instead of a user to make decision on how to display information sequentially. For having accurate control, a user can either separate one document type into several subtypes with each document type having a corresponding setup or define a set of rules, preference, and setup for guiding the system to perform tasks more specifically. Another example of the possible modifications is to let a user to generate feedback. According to user's feedback, the virtual secretary will provide corresponding information. A user can use the virtual secretary to read document such as email, which is as a particular document type. Associated with this particular document type, a user can define various rules for identifying the subject, the sender, the keywords involved, and important issues, specifying the filtering criterion, the presentation modes, etc. A user can also set up the virtual secretary to present information in certain way. For example, the virtual secretary will display or read the most important emails first, and when processing an email, display or read the most important issues first. A user can further inquire a question, ask for more detail, and ask for present in the way as original email. Upon receiving user's feedback, the virtual secretary can search for related information from the current email, previous emails, database, and Internet.

The specifications contained in the description and drawings should not be construed as limiting the scope of the invention but as merely providing illustrations. An ordinary person skilled in the art can make various modifications. Thus the scope of the invention should be determined by the claims and their legal equivalents, rather than by the examples and figures provided.

What is claimed is:

1. A system having a CPU and a demonstrating device, a plurality of document types, a plurality of structure templates for modeling a plurality of structures, a plurality of extracting procedures, a plurality of modifying procedures, and a plurality of presenting formats, for helping a reader to read a document efficiently by extracting a plurality of contents from said document, generating a plurality of revised contents by modifying said plurality of contents, and presenting said plurality of revised contents on said demonstrating device with a particular presenting format selected from said plurality of presenting formats, wherein each structure template has a plurality of sub-structure templates and corresponds to a particular document type, wherein each document type corresponds to a particular class of documents categorized according to a plurality of requirements of a plurality of readers, wherein each sub-structure template marks a corresponding content, said system comprising:

means for identifying a document type of said document from said plurality of document types by using at least one method selected from a group comprising source identification, author identification, title identification, topic identification, vocabulary identification, 4WH identification and author specification;

means for determining a particular structure template from said plurality of structure templates according to said document type;

means for building a structure with a plurality of sub-structures by instancing said particular structure template;

means for extracting said plurality of contents from said document according to said plurality of extracting procedures, wherein said plurality of extracting procedures extract information according to a plurality of preferences of said reader;

means for generating a plurality of revised contents by applying said plurality of modifying procedures on said plurality of contents, wherein said plurality of modifying procedures amend information according to said plurality of preferences of said reader;

means for filling said plurality of sub-structures by said plurality of revised contents;

means for organizing said structure into a structured document; and means for presenting said structure document through said demonstrating device according to said particular presenting format, whereby said structured document is significantly different from said document with information modified according to said plurality of preferences of said reader; and whereby said system extracts said plurality of contents from said document by running said plurality of extracting procedures on said CPU, organizes said plurality of contents in said structure, modifying said plurality of contents by said plurality of modifying procedures, and presents said plurality of revised contents on said demonstrating device according to said particular presenting format.

2. The system in claim 1, wherein said document is a regular document, said system further comprising means for removing redundant information, supplying necessary information, hiding some information, and presenting information according to said plurality of preferences, means for analyzing sentence structures, means for identifying meanings of words and phases, means for identifying objects, and means for identifying relations among objects, wherein said means for analyzing sentence structure further comprises means selected from a group comprising means for searching for background information about said document, means for identifying punctuation marks, means for identifying idioms and phrases, means for identifying special words, means for assigning possibilities to words being particular speech parts, means for extracting a plurality of contents with sentence structure knowledge available, means for identifying sections of a document, means for identifying paragraphs, means for identifying sentences, means for finding out subjects, predicates, adverb modifiers, and noun modifiers, means for analyzing relations among sentences, means for generating topic sentences, means for identifying relations among sections, means for providing interfaces for said reader to assign properties to related text portions, means for extracting information with a specific property, means for providing interface for said reader to extract interesting portions of text manually, and means for linking related sentence structures together.

3. The system in claim 1, wherein said demonstrating device comprises a display device and a speaking device, said system further comprising means for recording a reading process, means for illustrating said reading process through a device selected from a group comprising of said display device and speaking device, means for specifying a particular display sequence, means for specifying said particular presenting format, and means for specifying a particular procedure for a particular sub-structure instance.

4. The system in claim 1, wherein said document is a paper-based document, said system further comprising means for converting said paper-based document into an electronic document, means for separating figures from text, means for convening texts in an image format into a computer readable format, means for examining said structured document from a plurality of aspects, means for presenting said structured document horizontally, and means for presenting said structured document vertically.

5. The system in claim 1, wherein each structure template is associated with a plurality of display procedures, said system further comprising means for said reader to set up said plurality of preferences, a plurality of default values, and a plurality of default procedures, means for setting helping levels, means for modifying a particular display procedure, means for specifying a display sequence, means for specifying preferences, default values, and default procedures on system level and module level in a general session and a particular session.

6. The system in claim 1, said system further comprising means selected from a group comprising means for creating a new structure template, means for displaying all available structure templates associated with a document type, means for modifying an existing structure template, and means for modifying a particular structure.

7. The system in claim 1, said system further comprising means selected from a group comprising means for said reader to specify a particular display format for information contained in a particular sub-structure, means for providing a plurality of questions, means for extracting background information about said document means for extracting background information about said reader, means for said reader to select a text portion and assign it to a particular sub-structure manually, means for help said reader to preview and review, means for saving related information, and means for making use of saved information.

8. The system m claim 1, said system helping said reader to master speed reading skills to increase reading efficiency, said system further comprising means selected from a group comprising means for determining reader's familiarity on a subject, means for guiding said reader to relax mentally and physically, means for guiding said reader to survey, means for helping said reader to set up reading purpose and to speculate answers, means for helping said reader to determine a reading strategy, means for guiding said reader to practice speed reading, means for capturing said reader's actions, means for checking said reader's comprehension, means for adjusting helping levels, and means for helping said reader to evaluate comprehension, estimate progress and review effectiveness of each stage involved in a speed reading process.

9. A system comprising a CPU for assisting a reader to read a structured document efficiently, wherein said structured document is a document containing a plurality of structures, wherein each structure has a plurality of sub-structures for holding a plurality of contents and connecting to a plurality of presentation methods for a plurality categories of readers and for a plurality types of documents, said system comprising:

means for identifying a particular type of documents from said plurality types of documents by extracting related information from said structured document;

means for helping said reader to set up a plurality of preferences for said particular type of documents;

means for determining a particular structure to be built according to said particular type of documents and said plurality of preferences;

means for building said particular structure from said structured document by extracting said plurality of contents and filling each sub-structure by a corresponding content;

means for determining a particular presentation method from said plurality of presentation methods according to said plurality of preferences; and means for presenting said particular structure according to said particular presentation method, whereby said system recovers organized information from said structured document and delivers said organized information to said reader according to said plurality of preferences of said reader.

10. The system in claim 9, said system having a plurality types of documents and a plurality of structure templates for each type of documents and for each category of readers said system further comprising means for specifying a particular target audience and a particular document type;

means for selecting a structure template according to said particular document type and said particular target audience;

means for creating a structure with a plurality of sub-structures according to said structure template and a corresponding plurality of sub-structure templates, wherein said structure inherits a plurality of procedures from said structure template with said plurality of procedures to be run on said CPU to perform a plurality of specific tasks;

means for stimulating ideas to produce a plurality of ideas;

means for organizing said plurality of ideas to produce a plurality of organized ideas;

means for manipulating said plurality of organized ideas to produce a plurality of manipulated ideas;

means for developing a plurality of details for said plurality of manipulated ideas;

means for filling each sub-structure of said structure by a corresponding detail;

means for specifying a particular presentation suggestion for said particular target audience;

means for specifying a plurality of interesting sub-structures from said plurality of sub-structures for said particular target audience;

means for combining said plurality of interesting sub-structures and said particular presentation suggestion into said structured document, wherein said plurality of interesting sub-structures forms a reading structure; and means selected from a group comprising means for generating said plurality of structures by selecting a plurality of sets of a structure, means for generating said structured document by integrating said plurality of structures and said plurality of presentation suggestions, means for generating a derived sub-structure from a plurality of sub-structures in a same structure, and means for generating a derived sub-structure from a plurality of sub-structures in said plurality of structures, whereby said system helps examining ideas from various aspects, helps developing details for various target audiences, and helps generating said structured document comprised with various suggesting approaches for guiding said various target audiences to read; and whereby said reader can access information by following said plurality of presentation suggestions and said reader's specific requirements.

11. The system in claim 10, said system connected to a database and the Internet, said system further comprising means for collecting information, organizing information, displaying information, and building connection among information, and means for retrieving information.

12. The system in claim 10, wherein said system is connected to the Internet and a database, said system comprising means for modifying said structure, means for assigning a new property to said structure, means for searching for information from Internet and said database, means for detecting sentence patterns, providing variations, displaying good and bad examples, means for displaying information in various formats, means for examining information systematically, means for examining said structure vertically and horizontally, means for performing grammar analysis, and means for proving advices on editing and revising.

13. The system in claim 9, said system having a display device and a speaking device, said system further comprising means for sharing information, means for splitting information, means for combining information, means for building a new procedure, means for modifying an existing procedure, means for examining information horizontally and vertically, means for displaying information sequentially, means for stimulating ideas, means for organizing a plurality of ideas, and means for manipulating a plurality of organized ideas, wherein said means for determining a particular presentation method comprises means for determining said particular presentation method according to information contained in said structured document, means for determining said particular presentation method according to preferences of said reader, and means for means for determining said particular presentation method according to both said structured document and said preferences of said reader;

wherein said means for presenting said structure comprise means for displaying said plurality of contents on said display device and means for describing said plurality of contents through said sneaker device;

wherein said means for stimulating ideas comprise means selected from a group comprising means for creating branching and egging, means for creating Venn diagram, means for creating comparison list, means for mapping, means for displaying free association, and means for searching similar items, general items, and specific items;

wherein said means for organizing said plurality of ideas comprise means for displaying said plurality of ideas sequentially, means for displaying said plurality of ideas simultaneously, means for sorting said plurality of ideas according to alphabetical letters, means for sorting said plurality of ideas according to categories; and wherein said means for manipulating said plurality of organized ideas comprises means for converting an idea to a different one, means for displaying an idea in a different format, means for providing synonyms and antonyms, means for searching for information with several conditions satisfied simultaneously.

14. The system in claim 9, said system comprising a structure template selected from a group comprising a first set and second set, said first set comprising title, thesis statement, foreword, introduction, a plurality of sections with each section having a section header and section statement, a plurality of paragraphs with each paragraph having a topic sentence, a plurality of arguments with each argument associated with a plurality of examples, transition, and conclusion, and postscript; said second set comprising title, author, thesis statement, ideas, examples, comments, tables, and figures, whereby said system is able to produce a plurality of virtual cards.

15. A system for assisting a reader to read a document efficiently, said system comprising a CPU and a display device, having a plurality of structure templates with each structure template designed for helping a particular target audience to access information from a particular type of documents and associated with a plurality of procedures, wherein said plurality of procedures run on said CPU to perform a plurality of tasks to help said reader to collect information, organize information, and display information, said system comprising:

means for identifying a document type of said document by using at least one item selected from a group comprising document type information contained in said document, source identification, author identification, title identification, topic identification, vocabulary identification, 4WH identification and author specification to select a particular structure template, wherein each document type is categorized according to general reading requirements on a particular class of documents;

means for building a structure according to said particular template, said structure having a plurality of sub-structures to hold a plurality of contents to be extracted from said document;

means for filling said structure by extracting said plurality of contents from said document according to a corresponding procedure;

means for revising said plurality of contents to produce a plurality of modified contents and saving said plurality of modified contents into said plurality of sub-structures; and means for presenting said plurality of modified contents on said display device, whereby said system extracts information from said document, modify information, and presents information on said display device to help said reader to read efficiently.

16. The system in claim 15, said system further comprising means for manipulating said structure according to reader's preferences to generate a modified structure, means for organizing information according to reader's preferences, means for presenting information differently for different readers, means for presenting information differently for a same reader at different stages, means for capturing reader's responses, means for providing feedbacks, means for determining helping levels, means for generating questions, providing different explanations, and offering other examples, means for building a new procedure, and means for modifying an existing procedure.

17. The system in claim 15, wherein means for animating said modified structure further comprises means selected from a group comprising a first set of means and a second set of means, wherein said first set of means comprises of means for specifying a display form, means for specifying a plurality of interesting sub-structures, means for specifying a specific presentation format for each interesting sub-structure, and means for specifying a displaying sequence; wherein said second set of means comprises of means for specifying sentence structures, means for specifying different fonts for different sentence structures, means for displaying information by one selected from a group comprising word clusters, sentences, and paragraphs, means for updating presentation by one selected from a group comprising of internal timer and manual operation, means for flashing important words and phrases, and means for emphasizing important words and phrases by one selected a group comprising different font, different color, underline font, larger font, bold font, italic font, and longer interval.

18. The system in claim 15, said system comprising a speaker device, said system further comprising means for deriving information from said plurality of sub-structures, means for controlling volume, tone, and speed, and means for depicting information with playing function, repeating function, pausing function, forward function, backward function, slowing down function and speeding up function, whereby said system is able to provide animation presentation with tempo controlled by said reader.

19. The system in claim 15, said system further comprising means for identifying human objects and their conversations, means for specifying voice features for each commentator and for each human object, and means for specifying tones and emphasizing words for conversations, whereby said system is able to produce a radio drama according to said document with different people having different voice features.

20. The system in claim 15, said system further comprising means for extracting images from said document, means for generating images for texts, means for making images funnier, means for making images simplifier, means for making images more characteristic, means for linking images to related sub-structure, means for specifying when, where and how to display images, means for associating a particular image with a particular object, means for associating images with a particular event, and means for inserting images into a presentation, whereby said system is able to produce comical effects.

* * * * *